(12) United States Patent  
Urabe et al.

(10) Patent No.: US 11,599,263 B2  
(45) Date of Patent: Mar. 7, 2023

(54) INFORMATION PROCESSING DEVICE, METHOD, AND PROGRAM FOR GENERATING A PROXY IMAGE FROM A PROXY FILE REPRESENTING A MOVING IMAGE

(71) Applicant: Sony Group Corporation, Tokyo (JP)

(72) Inventors: Kazutaka Urabe, Tokyo (JP); Daisuke Hiranaka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/612,639

(22) PCT Filed: May 8, 2018

(86) PCT No.: PCT/JP2018/017732  
§ 371 (c)(1),  
(2) Date: Nov. 11, 2019

(87) PCT Pub. No.: WO2018/212013  
PCT Pub. Date: Nov. 22, 2018

(65) Prior Publication Data  
US 2020/0073546 A1 Mar. 5, 2020

(30) Foreign Application Priority Data  
May 18, 2017 (JP) .............................. JP2017-099275

(51) Int. Cl.  
*G11B 27/031* (2006.01)  
*G06F 3/04883* (2022.01)  
(Continued)

(52) U.S. Cl.  
CPC ...... *G06F 3/04883* (2013.01); *G06F 3/04847* (2013.01); *G11B 27/031* (2013.01); *G11B 27/10* (2013.01); *H04N 21/6175* (2013.01)

(58) Field of Classification Search  
CPC ............. G06F 3/04883; G06F 3/04847; G06F 3/0484; G06F 3/0488; G11B 27/031;  
(Continued)

(56) References Cited

U.S. PATENT DOCUMENTS 5,513,306 A    4/1996  Mills et al.  
5,649,171 A *  7/1997  Craven ................ G11B 27/028  
                                                            703/23

(Continued)

FOREIGN PATENT DOCUMENTS

CN    105684420 A    6/2016  
EP      1503381 A2   2/2005  
(Continued)

OTHER PUBLICATIONS

Extended European Search Report dated May 7, 2020 for corresponding European Application No. 18801395.7.

*Primary Examiner* — Dino Kujundzic  
(74) *Attorney, Agent, or Firm* — Michael Best & Friedrich LLP

(57) ABSTRACT

There is provided an information processing device that operates in a device including a display unit and causes the display unit to display a plurality of specific frame images constituting a moving image having a smaller data size than that of a moving image captured by another device different from the device including the display unit.

21 Claims, 19 Drawing Sheets

(51) Int. Cl.
*G06F 3/04847* (2022.01)
*G11B 27/10* (2006.01)
*H04N 21/61* (2011.01)

(58) Field of Classification Search
CPC ....... G11B 27/10; G11B 20/10; G11B 27/102; G11B 27/34; G11B 27/02; H04N 21/6175; H04N 5/76; H04N 5/77; H04N 5/91
See application file for complete search history.

(56) References Cited

U.S. PATENT DOCUMENTS

| | | | | |
|---|---|---|---|---|
| 6,134,380 A * | 10/2000 | Kushizaki | G11B 27/034 | 386/230 |
| 6,314,231 B1 * | 11/2001 | Tanaka | G11B 27/028 | 348/E5.051 |
| 6,573,907 B1 * | 6/2003 | Madrane | G06F 16/786 | 715/721 |
| 6,675,384 B1 * | 1/2004 | Block | H04N 7/06 | 348/E5.096 |
| 7,333,713 B1 * | 2/2008 | Ito | H04N 5/772 | 386/239 |
| 7,849,406 B2 * | 12/2010 | Okada | G11B 27/105 | 715/721 |
| 7,877,689 B2 * | 1/2011 | Gilley | H04N 5/765 | 715/723 |
| 8,330,802 B2 * | 12/2012 | Koppal | H04N 13/10 | 348/46 |
| 8,441,451 B2 * | 5/2013 | Son | G06F 3/0485 | 345/173 |
| 8,605,221 B2 * | 12/2013 | Deever | G06K 9/00765 | 348/590 |
| 8,682,142 B1 * | 3/2014 | Boskovitz | G11B 27/034 | 386/278 |
| 9,542,604 B2 * | 1/2017 | Cho | G06K 9/00751 | |
| 9,583,149 B2 * | 2/2017 | Stieglitz | H04N 21/435 | |
| 9,984,725 B2 * | 5/2018 | Yamasaki | G11B 27/005 | |
| 10,049,477 B1 * | 8/2018 | Kokemohr | G06T 11/60 | |
| 10,194,990 B2 * | 2/2019 | Amanatullah | A61B 17/16 | |
| 10,386,999 B2 * | 8/2019 | Burns | H04N 21/2387 | |
| 2002/0003576 A1 * | 1/2002 | Konishi | H04N 19/00 | 386/E5.072 |
| 2002/0056095 A1 * | 5/2002 | Uehara | G06F 16/735 | 725/38 |
| 2002/0069218 A1 * | 6/2002 | Sull | G11B 27/28 | 715/202 |
| 2002/0157005 A1 * | 10/2002 | Brunk | H04N 21/8358 | 713/176 |
| 2002/0188172 A1 * | 12/2002 | Irion | A61B 1/04 | 600/117 |
| 2003/0061612 A1 * | 3/2003 | Lee | G06F 16/784 | 725/61 |
| 2003/0146915 A1 * | 8/2003 | Brook | G11B 27/11 | 345/473 |
| 2004/0201609 A1 * | 10/2004 | Obrador | G06F 16/40 | 715/723 |
| 2004/0268223 A1 * | 12/2004 | Tojo | H04N 5/765 | 715/255 |
| 2005/0025454 A1 * | 2/2005 | Nakamura | G11B 27/031 | 386/280 |
| 2006/0008247 A1 * | 1/2006 | Minami | G11B 27/034 | 386/280 |
| 2006/0093315 A1 * | 5/2006 | Kelly | H04N 21/8455 | 386/283 |
| 2006/0265657 A1 * | 11/2006 | Gilley | G11B 27/034 | 715/730 |
| 2006/0294453 A1 * | 12/2006 | Hirata | G10L 15/26 | 715/203 |
| 2007/0189709 A1 * | 8/2007 | Ageishi | G11B 27/34 | 386/280 |
| 2007/0269182 A1 * | 11/2007 | Sato | H04N 9/8233 | 386/239 |
| 2008/0086688 A1 * | 4/2008 | Chandratillake | G06F 16/739 | 715/719 |
| 2008/0174570 A1 | 7/2008 | Jobs | | |
| 2008/0267576 A1 * | 10/2008 | Seo | G11B 27/28 | 386/241 |
| 2008/0292212 A1 * | 11/2008 | Ozaki | G11B 27/105 | 707/E17.031 |
| 2008/0304808 A1 * | 12/2008 | Newell | G11B 27/034 | 386/278 |
| 2009/0148069 A1 * | 6/2009 | Inoha | H04N 1/00442 | 382/305 |
| 2010/0011297 A1 * | 1/2010 | Tsai | G06F 16/743 | 715/721 |
| 2010/0050080 A1 * | 2/2010 | Libert | G06F 16/434 | 715/838 |
| 2010/0220978 A1 * | 9/2010 | Ogikubo | G11B 27/034 | 715/716 |
| 2010/0262913 A1 * | 10/2010 | Takagi | G06F 16/958 | 715/723 |
| 2010/0272187 A1 * | 10/2010 | Civanlar | H04N 21/64322 | 348/E5.062 |
| 2011/0078459 A1 * | 3/2011 | Yoshioka | G01N 21/93 | 713/189 |
| 2011/0205171 A1 * | 8/2011 | Akiyoshi | G11B 27/34 | 345/173 |
| 2011/0283188 A1 * | 11/2011 | Farrenkopf | G06F 3/04855 | 715/702 |
| 2011/0293250 A1 * | 12/2011 | Deever | H04N 5/275 | 386/290 |
| 2011/0296465 A1 * | 12/2011 | Krishnan | H04N 21/40 | 725/51 |
| 2011/0317022 A1 * | 12/2011 | Cao | H04N 7/181 | 348/207.11 |
| 2012/0315011 A1 * | 12/2012 | Messmer | H04N 21/84 | 386/230 |
| 2012/0321181 A1 * | 12/2012 | Yang | G06K 9/4609 | 382/165 |
| 2013/0031501 A1 * | 1/2013 | Kodosky | G06F 3/04842 | 715/771 |
| 2013/0145268 A1 * | 6/2013 | Kukulski | G11B 27/10 | 715/719 |
| 2013/0209059 A1 * | 8/2013 | Scheele | G11B 27/10 | 386/230 |
| 2013/0229374 A1 * | 9/2013 | Son | G11B 27/34 | 345/173 |
| 2013/0332836 A1 * | 12/2013 | Cho | G11B 27/031 | 715/723 |
| 2014/0071171 A1 * | 3/2014 | Mcgowan | G06F 3/04883 | 345/661 |
| 2014/0112641 A1 * | 4/2014 | Wang | H04N 5/85 | 386/241 |
| 2014/0223379 A1 * | 8/2014 | Shin | G06F 3/0482 | 715/838 |
| 2014/0282247 A1 * | 9/2014 | Yuan | G06F 3/017 | 715/823 |
| 2014/0313327 A1 * | 10/2014 | Motosaka | H04N 7/18 | 348/143 |
| 2014/0325034 A1 * | 10/2014 | Mclaughlin | H04N 21/26258 | 709/219 |
| 2015/0010286 A1 * | 1/2015 | Newman | H04N 19/44 | 386/230 |
| 2015/0058709 A1 * | 2/2015 | Zaletel | H04L 65/604 | 715/202 |
| 2015/0201150 A1 * | 7/2015 | Kimura | G09G 5/00 | 348/564 |
| 2015/0213836 A1 * | 7/2015 | Yamasaki | G11B 27/005 | 386/282 |
| 2015/0254871 A1 * | 9/2015 | MacMillan | G06T 3/0062 | 382/180 |
| 2015/0363409 A1 * | 12/2015 | Wood | G06F 16/44 | 707/738 |
| 2016/0005435 A1 * | 1/2016 | Campbell | G11B 27/3081 | 386/240 |
| 2016/0080835 A1 * | 3/2016 | von Sneidern | H04N 21/8549 | 386/282 |

(56) References Cited

U.S. PATENT DOCUMENTS

| | | | |
|---|---|---|---|
| 2016/0104045 A1* | 4/2016 | Cho | G11B 27/031 |
| | | | 386/223 |
| 2016/0300110 A1* | 10/2016 | Prosek | G06V 20/48 |
| 2016/0307296 A1* | 10/2016 | Lin | G06F 3/017 |
| 2016/0343403 A1* | 11/2016 | Yoshizawa | G11B 27/105 |
| 2017/0046833 A1* | 2/2017 | Lurie | G06T 5/008 |
| 2017/0076155 A1* | 3/2017 | Cho | G11B 27/32 |
| 2017/0168697 A1* | 6/2017 | Shpalter | H04N 21/6547 |
| 2017/0185843 A1* | 6/2017 | Goto | G06T 7/20 |
| 2017/0257414 A1* | 9/2017 | Zaletel | G06F 16/252 |
| 2018/0046631 A1* | 2/2018 | Choi | G06K 9/00979 |
| 2018/0063603 A1* | 3/2018 | Tang | H04N 21/478 |
| 2018/0113577 A1* | 4/2018 | Burns | H04N 21/47217 |
| 2018/0247560 A1* | 8/2018 | Mackenzie | G09B 23/28 |
| 2018/0247673 A1* | 8/2018 | Yamasaki | G11B 27/005 |
| 2018/0350052 A1* | 12/2018 | Julkunen | G06T 7/0004 |
| 2018/0359413 A1* | 12/2018 | Wu | H04N 5/232 |
| 2019/0281233 A1* | 9/2019 | Yorozu | H04N 5/2251 |
| 2019/0361577 A1* | 11/2019 | Burns | G11B 27/3081 |
| 2020/0012418 A1* | 1/2020 | Choi | H04N 7/147 |
| 2020/0068131 A1* | 2/2020 | Tadano | G03B 5/00 |
| 2021/0136467 A1* | 5/2021 | Kim | H04N 21/4542 |

FOREIGN PATENT DOCUMENTS

| | | |
|---|---|---|
| JP | 10-164497 A | 6/1998 |
| JP | 2001-359039 A | 12/2001 |
| JP | 2003-528519 A | 9/2003 |
| JP | 2010-246008 A | 10/2010 |
| JP | 2011-003977 A | 1/2011 |
| JP | 2011003978 A | 1/2011 |
| JP | 2011-170785 A | 9/2011 |
| JP | 2012054619 A | 3/2012 |
| JP | 2812-124789 A | 6/2012 |
| JP | 2014188986 A | 10/2014 |
| JP | 2816-208444 A | 12/2016 |
| JP | 2017-112455 A | 6/2017 |
| KR | 20020080403 A | 10/2002 |
| WO | WO-2014049989 A1 | 4/2014 |
| WO | 2014/147945 A1 | 9/2014 |

* cited by examiner

FIG. 5
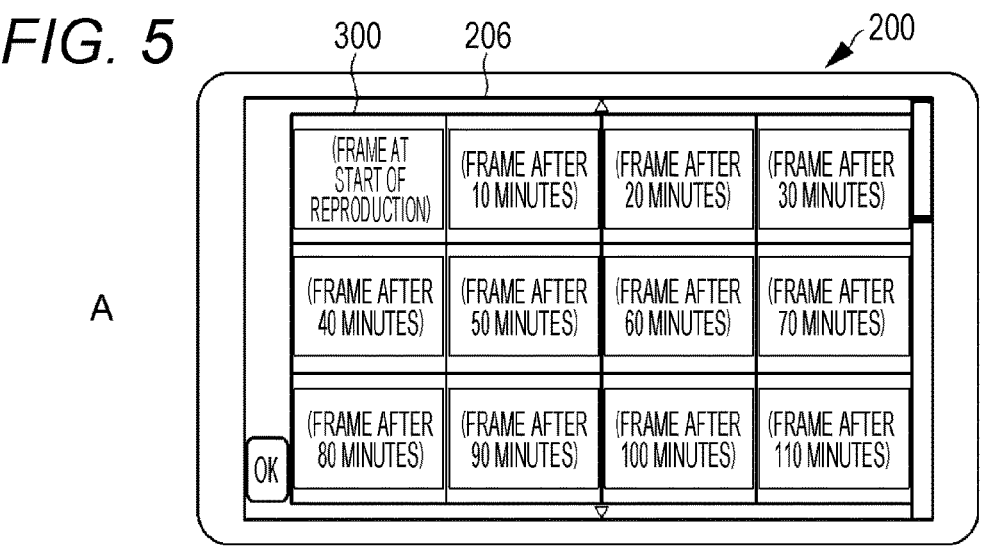
A
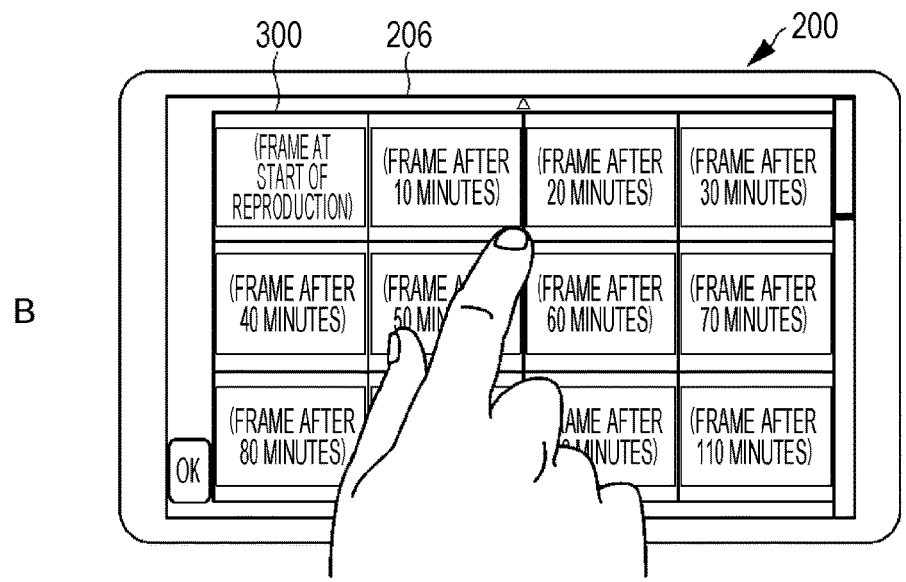
B
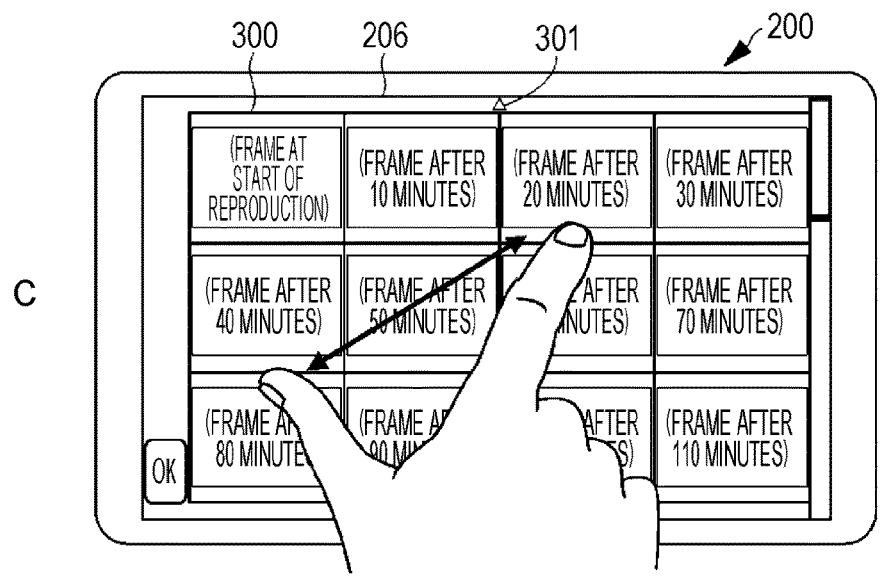
C

| | IN-POINT | OUT-POINT |
|---|---|---|
| 1 | 00:38:20 | 00:45:12 |
| 2 | 02:21:00 | 03:21:23 |
| 3 | 08:12:56 | 10:02:45 |
| 4 | 21:34:12 | 23:33:52 |
| 5 | 38:21:01 | 41:23:11 |
| 6 | 55:05:47 | 58:32:21 |

B

| | IN-POINT | OUT-POINT |
|---|---|---|
| 1 | 5 | 24 |
| 2 | 64 | 123 |
| 3 | 210 | 325 |
| 4 | 378 | 401 |
| 5 | 512 | 1004 |
| 6 | 1201 | 1542 |

FIG. 17
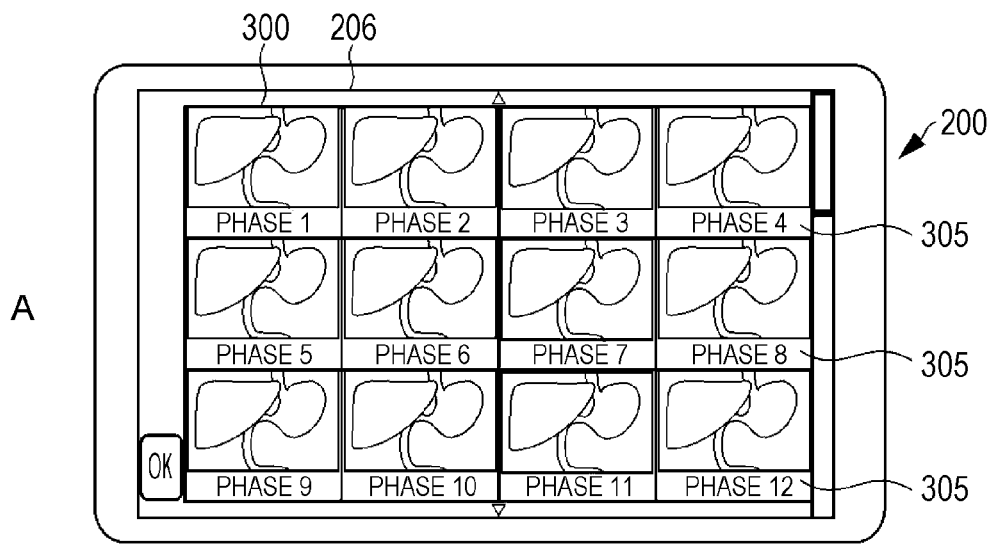
A
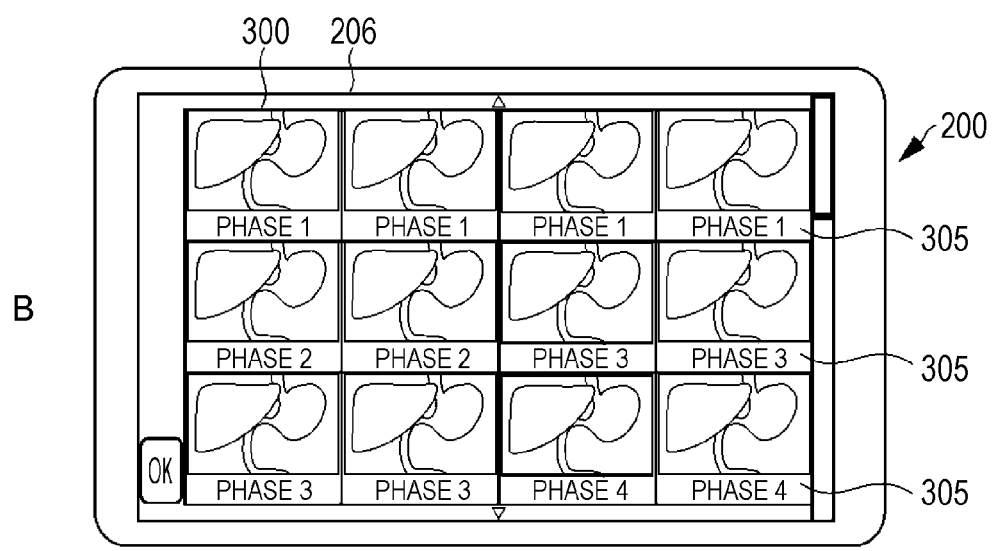
B

INFORMATION PROCESSING DEVICE, METHOD, AND PROGRAM FOR GENERATING A PROXY IMAGE FROM A PROXY FILE REPRESENTING A MOVING IMAGE

TECHNICAL FIELD

The present technology relates to an information processing device, an information processing method, and information processing program.

BACKGROUND ART

Currently, many users edit moving images taken using imaging devices or the like to make the moving images into video works, upload the moving images for services on the Internet, and show the moving images to friends.

A moving image editing and reproducing program operating in personal computers, terminal devices, and the like is generally used for such moving image editing (Patent Document 1). Generally, in a user interface of such a moving image editing program, all consecutive frame images constituting a moving image are displayed, and a desired scene is searched for through a scroll operation.

CITATION LIST

Patent Document

Patent Document 1: Japanese Patent Application Laid-Open No. 2016-208444

SUMMARY OF THE INVENTION

Problems to be Solved by the Invention

However, in a case where a moving image with a long recording time or a moving image in which similar scenes continue is edited, there is a problem that such a method takes time to search for a desired scene.

The present technology is contrived in view of such a problem, and an object thereof is to provide an information processing device, an information processing method, and an information processing program which are capable of easily and rapidly searching for a desired scene in a moving image.

Solutions to Problems

A first technology to achieve the above object relates to an information processing device that operates in a device including a display unit and causes the display unit to display a plurality of specific frame images constituting a moving image having a smaller data size than that of a moving image captured by another device different from the device including the display unit.

Furthermore, a second technology relates to an information processing method including: displaying a plurality of specific frame images constituting a moving image on a display unit in a device including the display unit, the moving image having a smaller data size than that of a moving image captured by another device different from the device including the display unit.

Moreover, a third technology relates to an information processing program causing a computer to execute an information processing method of displaying a plurality of specific frame images constituting a moving image on a display unit in a device including the display unit, the moving image having a smaller data size than that of a moving image captured by another device different from the device including the display unit.

Effects of the Invention

According to the present technology, it is possible to easily and rapidly search for a desired scene in a moving image. Meanwhile, effects described herein are not necessarily limiting and any effects described in the specification may be included.

BRIEF DESCRIPTION OF DRAWINGS

FIG. 5 is a diagram showing changes in time intervals between frame images which are displayed.

FIG. 8 is a diagram showing an outline of an edit list.

FIG. 17 is a diagram showing display modes of frame images of a moving image captured in an operating room system and meta information.

MODE FOR CARRYING OUT THE INVENTION

Hereinafter, embodiments of the present technology will be described with reference to the accompanying drawings. Meanwhile, the description will be given in the following order.

<1. First Embodiment>
[1-1. Configuration of Moving Image Editing System]
[1-2. Configuration of User Interface for Moving Image Editing]
<2. Second Embodiment>
[2-1. Configuration of Moving Image Editing System]
[2-2. Configuration of User Interface for Moving Image Editing]
<3. Third Embodiment>
[3-1. Configuration of Moving Image Editing System]
[3-2. Configuration of User Interface for Moving Image Editing]
<4. Application Example>
<5. Modification Example>

1. First Embodiment

[1-1. Configuration of Moving Image Editing System]

Figure 1:
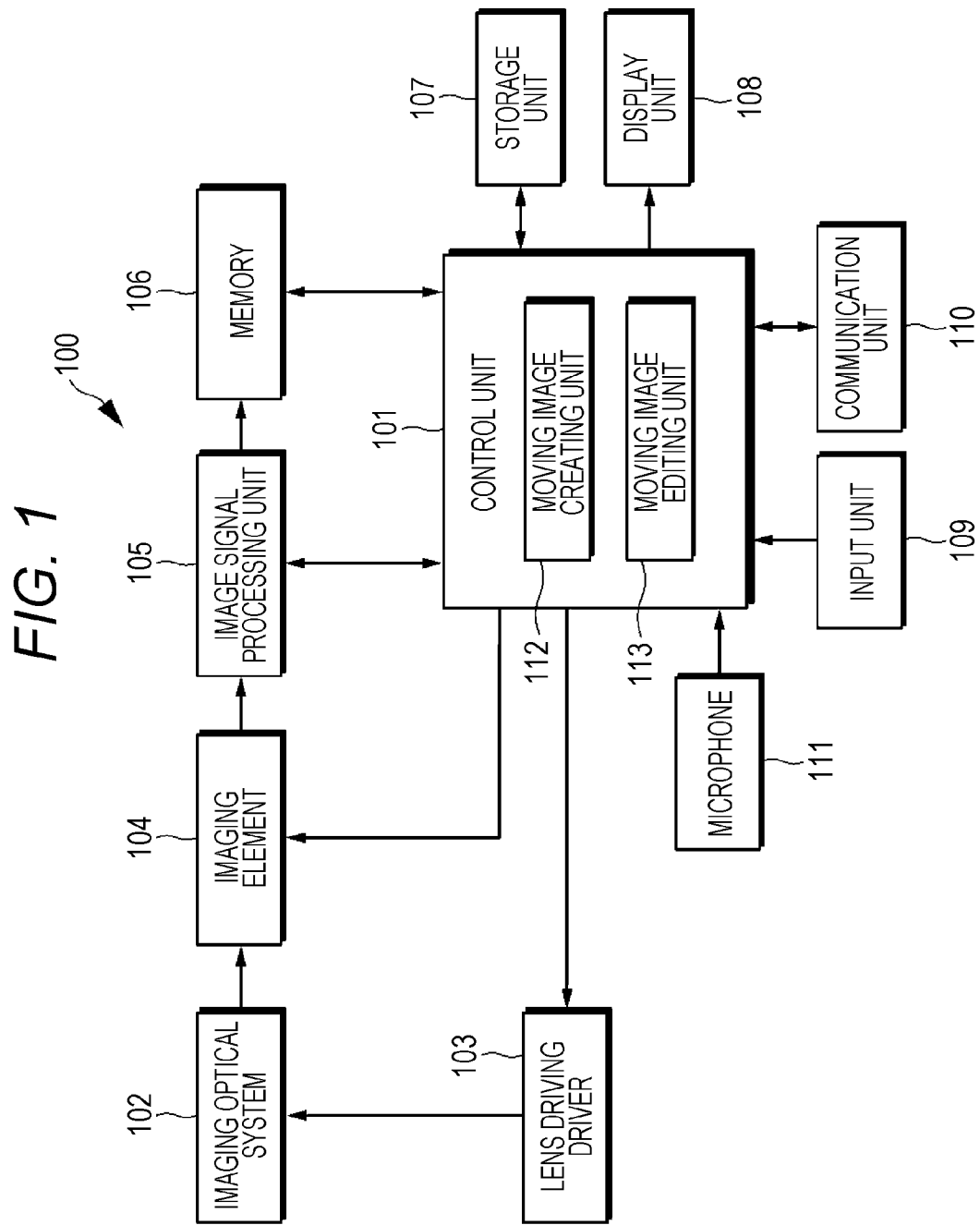
FIG. 1 is a block diagram showing a configuration of an imaging device of a moving image editing system according to the present technology.

First, a configuration of a moving image editing system according to the present embodiment will be described with reference to FIG. 1. The moving image editing system includes an imaging device 100 and a terminal device 200. In the moving image editing system, first, a moving image is captured by the imaging device 100, and a proxy file which is moving image data having a file size smaller than that of the moving image (hereinafter, referred to as an original moving image) data is transmitted to the terminal device 200. Next, a plurality of frame images constituting a moving image constituted by proxy files (hereinafter, referred to as a proxy moving image) are displayed in the terminal device 200 and presented to a user, and a moving image editing operation is received from the user. In addition, a result of the moving image editing operation is transmitted to the imaging device 100, and the imaging device 100 performs a moving image editing process.

The imaging device 100 includes a control unit 101, an imaging optical system 102, a lens driving driver 103, an imaging element 104, an image signal processing unit 105, a memory 106, a storage unit 107, a display unit 108, an input unit 109, a communication unit 110, a microphone 111, a moving image creating unit 112, and a moving image editing unit 113.

The control unit 101 includes a central processing unit (CPU), a random access memory (RAM), a read only memory (ROM), and the like. Programs which are read and operated by the CPU, and the like are stored in the ROM. The RAM is used as a work memory of the CPU. The CPU executes various processes in accordance with the programs stored in the ROM and issues commands to control the entire imaging device 100.

The imaging optical system 102 includes an imaging lens for condensing light from a subject into the imaging element 104, a driving mechanism, a shutter mechanism, an iris mechanism, and the like for moving the imaging lens to perform focusing and zooming. These are driven on the basis of control signals received from the control unit 101 and the lens driving driver 103 of the body of the imaging device 100. A light image of the subject obtained through the imaging optical system 102 is formed on the imaging element 104 included in the body of the imaging device 100.

The lens driving driver 103, which includes, for example, a micro-computer or the like, moves the imaging lens a predetermined amount in an optical axis direction under the control of the control unit 101 of the body of the imaging device 100 to perform auto-focusing to focus on a target subject. In addition, operations of the driving mechanism, the shutter mechanism, the iris mechanism, and the like of the imaging optical system 102 are controlled under the control of the control unit 101. Thereby, the adjustment of an exposure time (shutter speed) and the adjustment of an aperture value (F value) and the like are performed.

The imaging element 104 performs photoelectric conversion of light incident from a subject to convert the light into the amount of charge and outputs a pixel signal. In addition, the imaging element 104 outputs the pixel signal to a camera processing circuit. As the imaging element 104, a charge coupled device (CCD), a complementary metal oxide semiconductor (CMOS), and the like are used.

The image signal processing unit 105 performs sample holding for satisfactorily maintaining a signal/noise (S/N) ratio through correlated double sampling (CDS) processing, auto gain control (AGC) processing, analog/digital (A/D) conversion, and the like on an imaging signal output from the imaging element 104 to create an image signal.

In addition, the image signal processing unit 105 may perform predetermined signal processing such as demosaic processing, white balance adjustment processing, color correction processing, gamma correction processing, Y/C conversion processing, auto exposure (AE) processing, or resolution conversion processing on the image signal.

The memory 106 is a volatile memory, for example, a buffer memory constituted by a dynamic random access memory (DRAM). The memory 106 temporarily stores image data on which predetermined processing has been performed by the image signal processing unit 105.

The storage unit 107 is, for example, a large-capacity storage medium such as a hard disk or an SD memory card. Still images and moving images captured by the imaging device 100 are stored in the storage unit 107. The moving images are stored, for example, in a format such as moving picture experts group 2 (MPEG2) or MPEG4.

The display unit 108 is a display device constituted by, for example, a liquid crystal display (LCD), a plasma display panel (PDP), or an organic electro luminescence (EL) panel, or the like. A user interface of the imaging device 100, a menu screen, a monitoring image being captured, captured images and captured moving images recorded in the storage unit 107, and the like are displayed on the display unit 108.

The input unit 109 inputs an imaging instruction, various settings, and the like to the body of the imaging device 100. When a user performs an input to the input unit 109, a control signal in response to the input is generated and output to the control unit 101. In addition, the control unit 101 performs arithmetic processing corresponding to the control signal and controls the imaging device 100. Examples of the input unit 109 include a touch panel integrally formed with the display unit 108, in addition to hardware buttons such as a release button, an imaging start instruction button, a power button for switching power on and power off, and an operator for zooming adjustment.

The communication unit 110 is a communication module for the imaging device 100 and the terminal device 200 to transmit and receive various data such as a proxy file and an edit list. Communication with the terminal device 200 may be either wired communication such as universal serial bus (USB) communication or wireless communication such as a wireless local area network (LAN) including Wi-Fi, Bluetooth, or ZigBee.

The microphone 111 collects sounds at the time of capturing a moving image and supplies a sound signal to the control unit 101.

The moving image creating unit 112 configures a series of frame images processed by the image signal processing unit 105 as a moving image and associates the moving image with sound data to create an original moving image. In addition, a proxy file is created from the original moving image.

The moving image creating unit 112 creates a proxy file so that the proxy file has a file size smaller than that of original moving image data. A method of reducing the size of the proxy file includes reducing a frame rate of an original moving image, reducing a bit rate, reducing a resolution, reducing an image size, thinning out frame images, and the like. Among these methods, any one method may be performed, or the size of the proxy file may be reduced by a combination of the methods.

In addition, a method of reducing the size of the proxy file may be selected depending on the type of moving image. For example, when a moving image obtained by recording a television program is edited, a resolution may be reduced to such a degree that a subject person cannot be discriminated in a case where it is only required to distinguish between a studio scene, a relay scene, and a commercial, and thus a bit rate can be further reduced.

When the size of the proxy file is large, it takes a long time to transmit the proxy file from the imaging device 100 to the terminal device 200, and a time from the termination of imaging to the start of moving image editing increases. It is possible to reduce a transmission time of the proxy file from the imaging device 100 to the terminal device 200 and reduce a time from the termination of imaging to the start of moving image editing by reducing the size of the proxy file.

In addition, although details will be described later, a plurality of frame images constituting a proxy moving image are displayed at one time on the display unit 108 of the terminal device 200 in a user interface for moving image editing according to the present technology. Accordingly, an increase in the size of a proxy file leads to a concern that display may be delayed due to pressure on the capacity of a memory for the display or a defect may occur in the display, and thus it is preferable to transmit the proxy file with a reduced file size.

Figure 2:
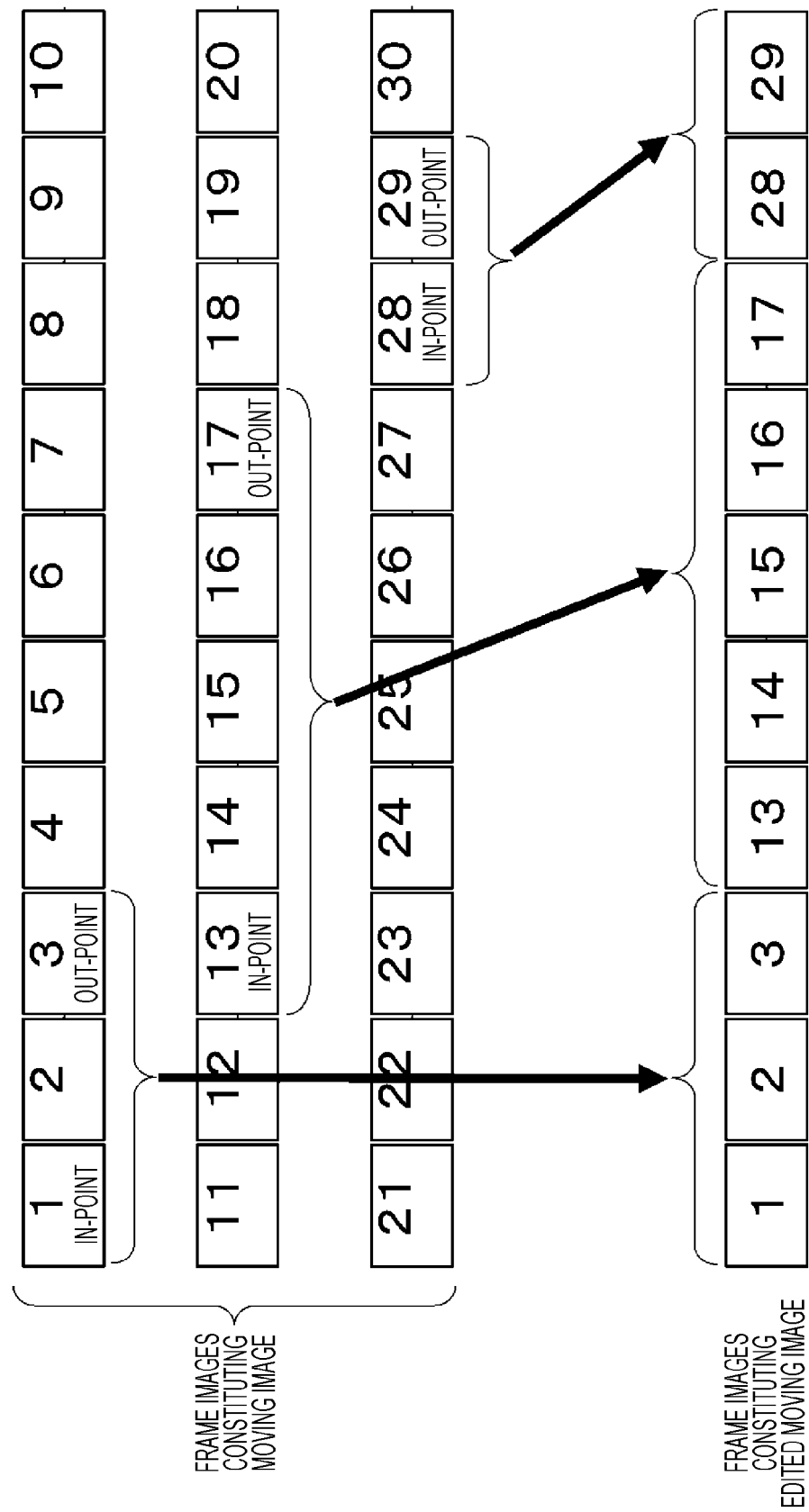
FIG. 2 is a diagram showing an outline of moving image editing.

The moving image editing unit 113 receives results of a moving image editing operation transmitted from the terminal device 200 to perform a moving image editing process. As shown in FIG. 2, the moving image editing includes designating an in-point which is a starting point of a desired scene and an out-point which is a termination point with respect to frame images constituting a moving image and creating a moving image in which only user's desired scenes are connected to each other with reference to the in-point and the out-point. In the present embodiment, the terminal device 200 receives in-points and out-points designated by the user to create a list of in-points and out-points (hereinafter, referred to as an edit list), and the imaging device 100 performs a moving image editing process with reference to the edit list. The edit list is equivalent to editing point information in the claims.

The moving image creating unit 112 and the moving image editing unit 113 are constituted by a program, and the program may be installed in the imaging device 100 in advance or may be downloaded or distributed on a storage medium or the like to be installed by the user. The control unit 101 may function as the moving image creating unit 112 and the moving image editing unit 113 by executing the program. In addition, the moving image creating unit 112 and the moving image editing unit 113 may be realized not only by the program but also by a combination of a dedicated device using hardware having the function, a circuit, and the like.

Figure 3:
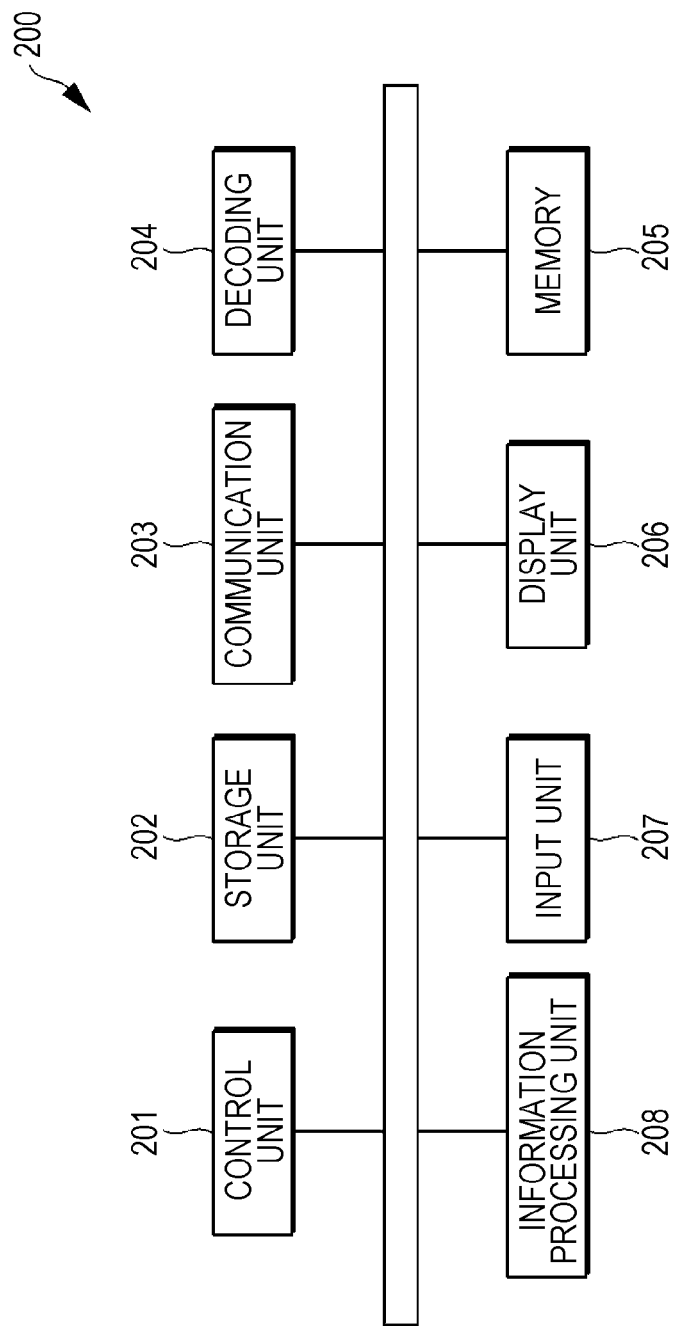
FIG. 3 is a block diagram showing a configuration of a terminal device of the moving image editing system.

Next, the terminal device 200 constituting the moving image editing system will be described with reference to FIG. 3. Examples of the terminal device 200 include a personal computer, a tablet terminal, a smartphone, and the like. In the present embodiment, it is assumed that the terminal device 200 is a tablet terminal that includes a touch panel and can be used by the user's touch operation.

The terminal device 200 includes a control unit 201, a storage unit 202, a communication unit 203, a decoding unit 204, a memory 205, a display unit 206, an input unit 207, and an information processing unit 208.

The control unit 201 is constituted by a CPU, a RAM, a ROM, and the like. Programs which are read and operated by the CPU, and the like are stored in the ROM. The RAM is used as a work memory of the CPU. The CPU executes various processes in accordance with the programs stored in the ROM and issues commands to control the entire terminal device 200.

The storage unit 202 is, for example, a large-capacity storage medium such as a hard disk or an SD memory card. A proxy file received by the communication unit 203 is stored in the storage unit 202.

The communication unit 203 is a communication module for the terminal device 200 and the imaging device 100 to transmit and receive various data such as a proxy file and an edit list. Communication with the terminal device 200 may be either wired communication such as USB communication or wireless communication such as a wireless LAN including Wi-Fi, Bluetooth, or ZigBee. A proxy file is transmitted from the imaging device 100 to the terminal device 200 through communication in the communication unit 203.

The decoding unit 204 decodes the proxy file transmitted from the imaging device 100 to configure a proxy moving image. Frame images and sounds constituting the proxy moving image decoded by the decoding unit 204 are developed in the memory 205.

The memory 205 is used as a work memory that performs processing for moving image editing to be executed by the information processing unit 208.

The display unit 206 is a display device constituted by, for example, an LCD, a PDP, an organic EL panel, or the like. A user interface of the terminal device 200, a menu screen, a user interface for moving image editing according to the present technology, and the like are displayed on the display unit 206.

The input unit 207 receives inputs such as the user's operation for the terminal device 200 and an operation for the user interface for moving image editing. When the user performs an input to the input unit 207, a control signal corresponding to the input is generated and output to the control unit 201 and the information processing unit 208. In addition, the control unit 201 performs arithmetic processing in response to the control signal and controls the terminal device 200. In addition, the information processing unit 208 controls the user interface for moving image editing. Examples of the input unit 207 include a touch panel configured integrally with the display unit 206, a pointing device for tracing and operating a flat plate-like sensor not integrated with the display unit 206 and called a track pad or a touch pad using a finger, a keyboard, a mouse, and the like. In the present embodiment, the input unit 207 is a touch panel configured integrally with the display unit 206.

In the touch panel, each of operations simultaneously performed at a plurality of locations on a screen which is an operation surface can be detected, and information indicating a contact position can be output. Further, in the touch panel, it is also possible to detect each of operations repeatedly performed on the operation surface and output information indicating each contact position.

Thereby, the touch panel receives various inputs and operations such as a so-called tap operation, double tap operation, long-press operation, swipe operation, flick operation, and pinch operation from the user, and these operations can be detected.

The tap operation is an input operation of bringing the user's finger or the like into contact with the operation surface only once for a short period of time. The double tap operation is an input operation of bringing a finger or the like into contact with the operation surface twice consecutively at a short time interval. These operations are mainly used for an input of a decision, or the like. The long-press operation is an input operation of bringing the user's finger or the like into contact with the operation surface and maintaining the contact state for a predetermined period of time.

The swipe operation is also called a tracing operation, and is an input operation of moving the user's finger or the like while it is in contact with the operation surface. The flick operation is an input operation of indicating one point on the operation surface with the user's finger or the like and then quickly flicking it in any direction. Thereby, for example, when a plurality of images are displayed on the display unit 108 and viewed by moving a display range of long content which does not fall within one screen, the images can be switched and turned over.

The pinch operation is an input operation of first bringing two of the user's fingers or the like into contact with the operation surface at the same time and then opening the two fingers or the like or closing them to pinch the operation surface. For example, it is possible to perform an input for enlarging or reducing a frame indicating a region displayed on the display unit 206 through a pinch operation. Meanwhile, in the pinch operation, an operation of opening the two fingers or the like in contact with the operation surface is referred to as a pinch-out operation, and an operation of closing the two fingers or the like is referred to as a pinch-in operation.

When an input is performed on a touch panel serving as the input unit 207, input information indicating a contact position is supplied to the control unit 201 and the information processing unit 208 from the input unit 207.

The information processing unit 208 executes a moving image editing application to perform a process of displaying frame images in the user interface for moving image editing, a process corresponding to the user's input, and the like. Details of processing performed by the information processing unit 208 will be described later. The information processing unit 208 is equivalent to an information processing device in the claims.

The information processing unit 208 is constituted by a program, and the program may be installed in the terminal device 200 in advance or may be downloaded or distributed on a storage medium or the like to be installed by the user. The control unit 201 may function as the information processing unit 208 by executing the program. In addition, the information processing unit 208 may be realized not only by the program but also by a combination of a dedicated device using hardware having the function, a circuit, and the like.

The imaging device 100 and the terminal device 200 constituting the moving image editing system are configured as described above.

[1-2. Configuration of User Interface for Moving Image Editing]

Next, the user interface for moving image editing displayed on the display unit 206 of the terminal device 200 and the user's moving image editing operation will be described. The moving image editing operation performed here is for creating an edit list which is a list of in-points which are starting points and out-points which are termination points of the user's desired scenes in a proxy moving image of the scenes. The display of the user interface for moving image editing and the processing of operation and change processing of the user interface according to the user's input are performed by the information processing unit 208.

First, when the capturing of a moving image by the imaging device 100 is terminated, the moving image creating unit 112 creates a proxy file automatically or in response to the user's instruction and transmits the proxy file to the terminal device 200 through communication between the communication unit 110 and the communication unit 203.

Meanwhile, in the following description, it is assumed that the input unit 207 of the terminal device 200 is a touch panel configured integrally with the display unit 206, and the user's input is performed by bringing a finger into contact with the touch panel.

Figure 4:
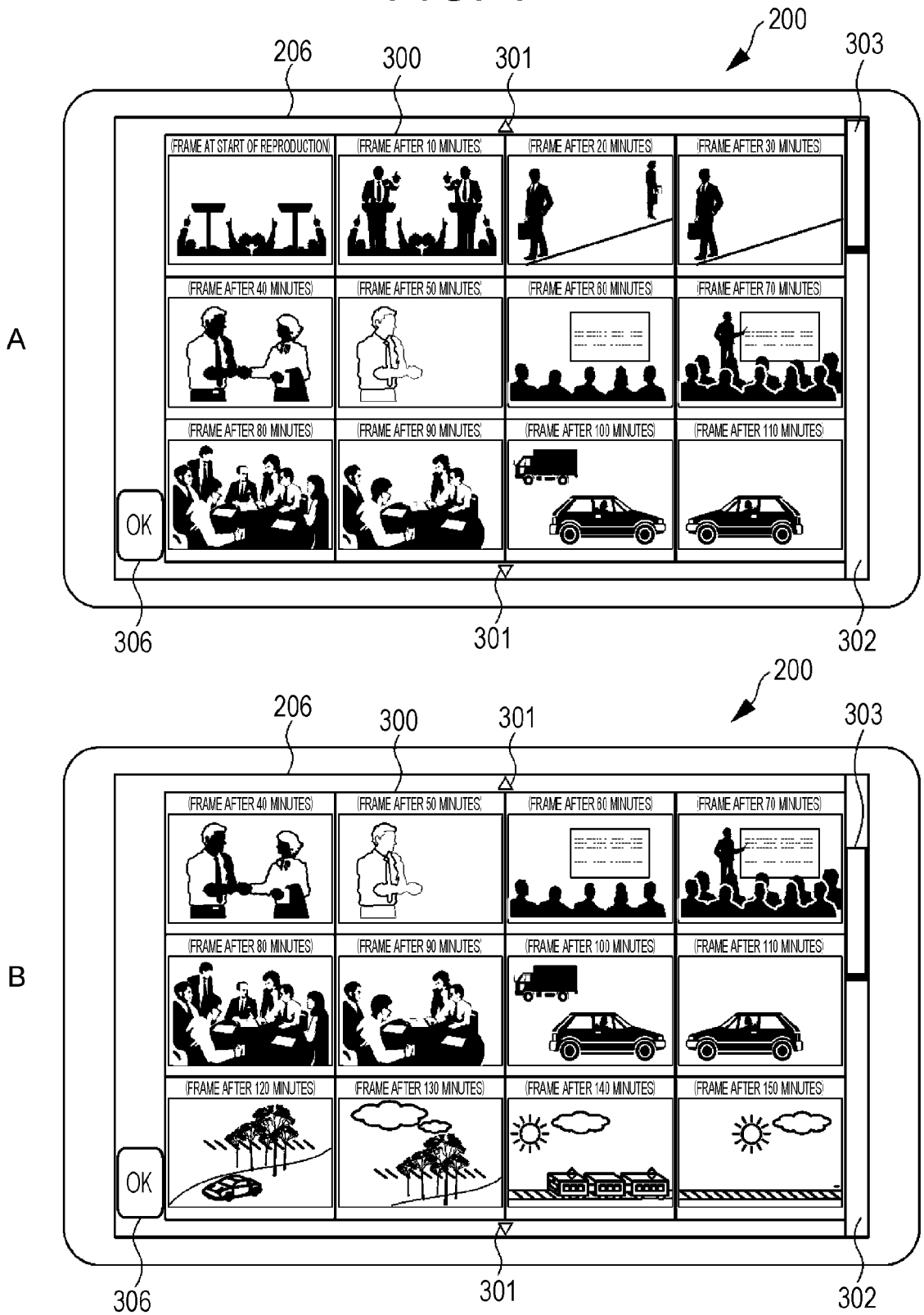
FIG. 4 is a diagram showing a configuration of a user interface for moving image editing.

FIG. 4 shows a user interface for moving image editing according to a first embodiment. The user interface includes a frame display area 300, an indicator 301, a scroll bar 302, a slider 303, and a decision button 304.

The frame display area 300 displays frame images constituting a proxy moving image and is divided into a total of twelve areas of three areas in a vertical direction by four areas in a horizontal direction. In the frame display area 300, an upper left end is set as a starting position, and frame images are displayed to advance to an upper right end in time series, move to a middle left end, advance to a middle right end, move to a lower left end, and advance to a lower right end.

Meanwhile, the number of areas obtained by the division of the frame display area 300 is not limited to twelve and may be equal to or greater than or may be equal to or less than twelve, and the number of areas obtained by the division may be changed depending on the number of frame images constituting the proxy moving image. Meanwhile, in FIG. 4, the wording "a frame after . . . minutes" under each frame image displayed in the frame display area 300 does not indicate that such a character string is not displayed in the frame display area 300 and shows what kind the displayed frame image is, for convenience of description.

In a case where the number of frame images constituting the proxy moving image is equal to or greater than the number of areas obtained by the division of the frame display area 300 displayed on one screen (in the example of FIG. 4, in a case where the number of frame images is equal to or greater than twelve), the indicators 301 are displayed above and below the frame display area 300 on the display unit 206.

The indicator 301 indicates that there are frame images constituting the proxy moving image in addition to the frame images which are currently displayed in the frame display area 300. The user performs a swipe operation or a flick operation on the touch panel, so that it is possible to scroll the frame display area 300 in a direction in which the indicator 301 is present. Thereby, it is possible to display frame images in addition to the frame images displayed in the frame display area 300.

The scroll bar 302 is displayed on the right side of the frame display area 300, and the slider 303 is displayed on the scroll bar 302 in an overlapping manner. The position of the slider 303 indicates where the frame image currently displayed in the frame display area 300 is positioned in the entire moving image.

The width of the slider 303 in a vertical direction indicates the proportion and a display range of frame images currently displayed in the frame display area 300, among all of the frame images constituting the proxy moving image, and a display range. In a case where the user scrolls the frame display area 300 by performing a swipe operation or a flick operation on the touch panel, the slider 303 is moved in a direction similar to the scroll direction.

The decision button 304 is a button for instructing the user to register in-points and out-points as an edit list in a case where the user terminates the designation of all of the in-points and the out-points.

In the present embodiment, not all frame images constituting a proxy moving image are displayed in the frame display area 300 in time series, and specific frame images extracted at predetermined time intervals are displayed side by side.

In the frame images displayed in the frame display area 300 shown in FIG. 4A, a frame image at an upper left end is a frame image when the proxy moving image starts to be reproduced, and a frame image to be reproduced 10 minutes after the start of reproduction, a frame image to be reproduced 20 minutes after the start of reproduction, . . . and a frame image to be reproduced 110 minutes after the start of reproduction are displayed side by side.

When the frame display area 300 is scrolled downward from the state shown in FIG. 4A, the state transitions to a state shown in FIG. 4B, and a frame image to be reproduced 120 minutes after the start of reproduction, which is continuous with the frame image to be reproduced 110 minutes after the start of reproduction, to a frame image to be reproduced 150 minutes after the start of reproduction are displayed. In a case where there is a frame image after a frame image to be reproduced 145 minutes after the start of reproduction, the frame image is displayed by further scrolling the frame display area 300 downward.

When the frame display area 300 is scrolled upward in the state shown in FIG. 4B, the state shown in FIG. 4A is set.

In this manner, in the present embodiment, not all frame images constituting a proxy moving image are displayed in the frame display area 300, and only specific frame images are displayed. In the example shown in FIG. 4, the specific frame images are frame images extracted at a fixed time interval (10 minutes) from the start of reproduction of the moving image from the plurality of consecutive frame images constituting the proxy moving image.

In this manner, only specific frame images are extracted and displayed without displaying all frame images constituting a proxy moving image, and thus the user can easily ascertain a configuration of the entire moving image, scene transition, and the like at a glance or by reducing the number of scroll operations of the frame display area 300. In addition, even in a long moving image, it is possible to search for a desired scene in the moving image with a small number of scroll operations.

When all frame images constituting a proxy moving image are displayed, the user has to perform a scroll operation a large number of times in order to ascertain a configuration of the entire moving image and scene transition and to search for a desired scene, which results in an increase in time. This problem can be solved in the present technology.

Time intervals between frame images displayed in the frame display area 300 can be changed by the user's input. In this regard, description will be given with reference to FIG. 5 and FIG. 6. Meanwhile, in FIG. 5 and FIG. 6, subjects in frame images displayed in the frame display area 300 are omitted for convenience of description, and elapsed times from the start of reproduction of a moving image are described.

For example, a case where there is a frame image desired to be set as an in-point by the user in the vicinity of a frame image to be reproduced 50 minutes after the start of reproduction of the moving image is considered. In this case, the user needs to check frame images included in a range from a frame image to be reproduced 40 minutes after the start of reproduction to the frame image to be reproduced 50 minutes after the start of reproduction and a range from the frame image to be reproduced 50 minutes after the start of reproduction to a frame image to be reproduced 60 minutes after the start of reproduction. Since the frame images are displayed at intervals of 10 minutes in the state shown in FIG. 5A, it is necessary to display frame images at shorter time intervals in order to check the frame images.

In this case, as shown in FIGS. 5B and 5C, when the user performs a pinch-in operation with the frame image to be reproduced 50 minutes after the start of reproduction as substantially the center, time intervals between frame images to be displayed are changed as shown in FIG. 6A. In the case of a pinch-in operation, a time interval between frame images is changed to be reduced, and frame images extracted at time intervals of 5 minutes such as 25 minutes, 30 minutes, 35 minutes, . . . , and 80 minutes after the start of reproduction are displayed in FIG. 6A.

Meanwhile, a display position of a frame image to be reproduced 50 minutes after the start of reproduction which is substantially the center of the pinch-in operation is fixed, and the position thereof is not changed.

Further, when the user widens an interval between fingers in the pinch-in operation, a time interval between frame images is further reduced as shown in FIG. 6B, and frame images extracted at time intervals of one minute such as 45 minutes, 46 minutes, 47 minutes, . . . , and 56 minutes after the start of reproduction are displayed. Also in this state, a display position of a frame image to be reproduced 50 minutes after the start of reproduction which is substantially the center of the pinch-in operation is fixed, and the position thereof is not changed.

Further, when the user widens an interval between the fingers in the pinch-in operation, a time interval between the frame images is further reduced as shown in FIG. 6C, and a state where all of the frame images are finally displayed in time series is set. Also in this state, a display position of a frame image to be reproduced 50 minutes after the start of reproduction which is substantially the center of the pinch-in operation is fixed, and the position thereof is not changed.

On the other hand, in contrast, the user performs a pinch-out operation with a frame image to be reproduced 50 minutes after the start of reproduction as substantially the center, and thus it is possible to reduce a time interval between frame images. Performing a pinch-out operation with the frame image to be reproduced 50 minutes after the start of reproduction as substantially the center in the state shown in FIG. 6C leads to a state shown in FIG. 6B, and further, reducing an interval between the fingers in the pinch-out operation leads to a transition to the state shown in FIGS. 6A and 5A. Also in a case of the pinch-out operation, a display position of the frame image to be reproduced 50 minutes after the start of reproduction which is substantially the center of the pinch-out operation is fixed, and the position thereof is not changed.

A pinch-in operation in a smartphone or a tablet terminal is generally an operation which is used to confirm particulars/details by enlarging an object, and a pinch-out operation is generally an operation which is used to confirm the entirety/wide range by reducing an object. Accordingly, it is possible to intuitively change a time interval between frame images by reducing the time interval in accordance with a pinch-in operation to confirm details of a proxy moving image and enlarging the time interval in accordance with a pinch-out operation to confirm the entirety/wide range of the proxy moving image. Thereby, it is possible to easily search for a desired frame image to be set as an in-point or an out-point.

Meanwhile, in the above description, a time interval between frame images changes to 10 minutes, 5 minutes, and 1 minute in accordance with a pinch-in operation and a pinch-out operation. However, this is merely an example, and a change in a time interval is not limited to such variation widths and may have any variation width. In addition, the user may be able to set a variation width of a time interval. Further, regardless of an interval between fingers in a pinch-in operation and a pinch-out operation, a time interval between frame images may change with a fixed variation width when one pinch-in operation or one pinch-out operation is performed.

Figure 6:
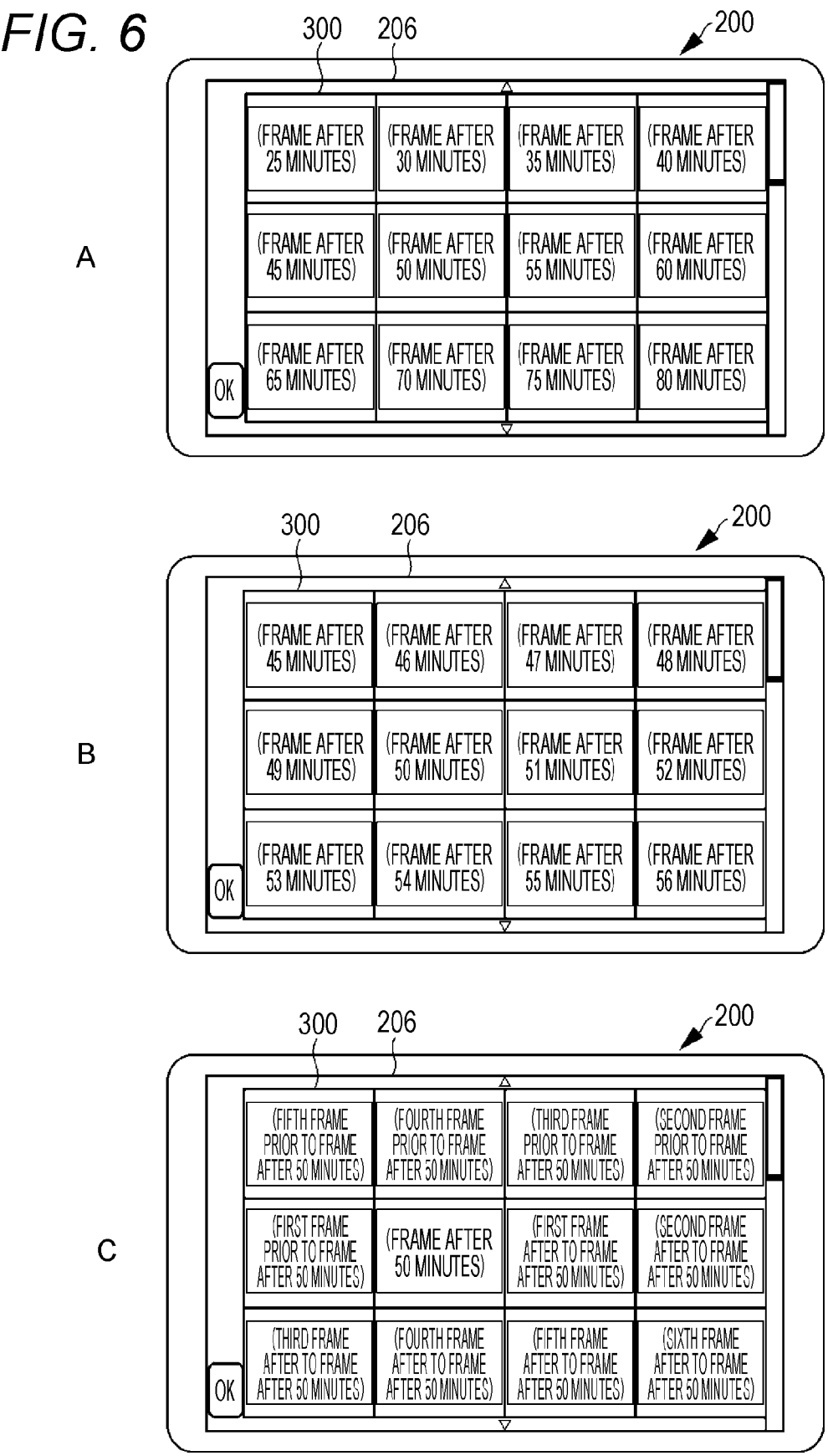
FIG. 6 is a diagram showing changes in time intervals between frame images which are displayed.

As described above, a display position of a frame image (the frame image to be reproduced 50 minutes after the start of reproduction in FIG. 5 and FIG. 6) serving as a reference of a change in a time interval which is positioned at substantially the center of a finger in a pinch-in operation and a pinch-out operation does not change even when the time interval is changed. Thereby, a reference frame image is not missed even when a time interval between frame images is changed, and thus it is possible to improve efficiency of searching for a frame image serving as an in-point or an out-point.

Figure 7:
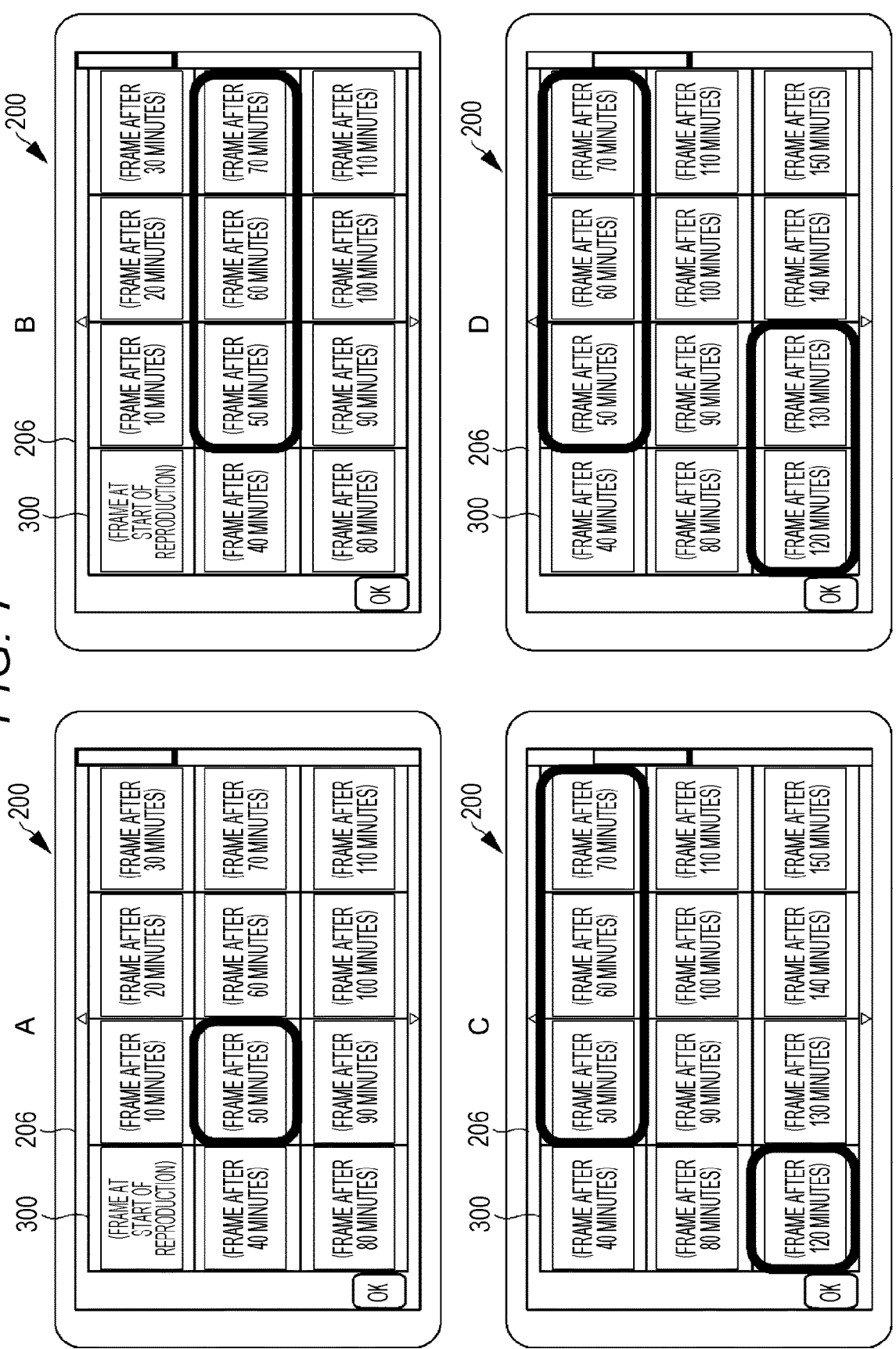
FIG. 7 is a diagram showing designation of in-points and out-points.

In a case where the user searches for a frame image serving as an in-point or an out-point, the user performs an input operation for designating the frame image as an in-point or an out-point. A tap operation or a double tap operation is preferable as the input operation for designation. When an operation of designating an in-point or an out-point is performed by the user, display for emphasizing the designated frame image is performed as shown in FIG. 7A, and the designated state is held. The emphasis display may be any display, such as surrounding the frame image with a thick frame as shown in FIG. 7A, blinking the frame image, highlighting the frame image, or changing the color of the frame image, as long as the user can recognize designation.

Further, next, in a case where the user searches for another frame image serving as an in-point or an out-point, the user similarly performs an input operation for designating the frame image. When two frame images are designated, all frame images between the designated two frame images are highlighted as shown in FIG. 7B, and a frame image with an earlier reproduction time serves as an in-point and a frame image with a later reproduction time serves as an out-point. In this manner, the user's desired scene is specified in accordance with the in-point and the out-point.

Meanwhile, the designation of an in-point and an out-point may be performed in accordance with a swipe operation (tracing operation) of bringing a finger into contact with the frame image serving as an in-point and then tracing the finger to the frame image serving as an out-point.

The user performs such an input until all of the in-points and the out-points are designated. A frame image to be reproduced 120 minutes after the start of reproduction is further designated as an in-point in FIG. 7C, and a frame image to be reproduced 130 minutes after the start of reproduction is designated as an out-point in FIG. 7D. In this manner, it is possible to designate a plurality of in-points and out-points without limiting the number of in-points and out-points for a proxy moving image.

Meanwhile, besides the above-described method, as a method of designating an in-point and an out-point, a frame image designated first may be set to be an in-point, and a frame image designated next may be set to be an out-point. In addition, the user may first input which one of an in-point or an out-point is designated and then perform an input for designating a frame image.

When all of the in-points and the out-points are designated by the user and an input is performed on the decision button 304, all of the in-points and the out-points are registered in an edit list. As shown in FIG. 8A, the edit list as editing point information is information in which elapsed times from the start of reproduction of frame images designated as in-points and out-points by the user are described as a list. Meanwhile, as shown in FIG. 8B, the edit list may be constituted by numerical values indicating which frame image from the start of reproduction the frame image set to be an in-point or an out-point is. Individual in-points and out-points may be registered in the edit list each time they are designated. The edit list may be constituted by any information as long as frame images designated as an in-point and an out-point can be specified.

When the designation of all of the in-points and the out-points is terminated and an edit list is created, the terminal device 200 transmits the edit list to the imaging device 100. The imaging device 100 having received the edit list performs the moving image editing process shown in FIG. 2 with reference to the edit list. In addition, edited moving image data is stored in the storage unit 107 of the imaging device 100 and is transmitted to another equipment or the like other than the terminal device 200 and the terminal device 200. Since the edited moving image is a moving image obtained by extracting only desired scenes by the user and combining the scenes, the moving image has a data size smaller than that of the original moving image data. Accordingly, it is possible to perform transmission and various processes in a shorter period of time than when the original moving image data itself is transmitted.

Figure 9:
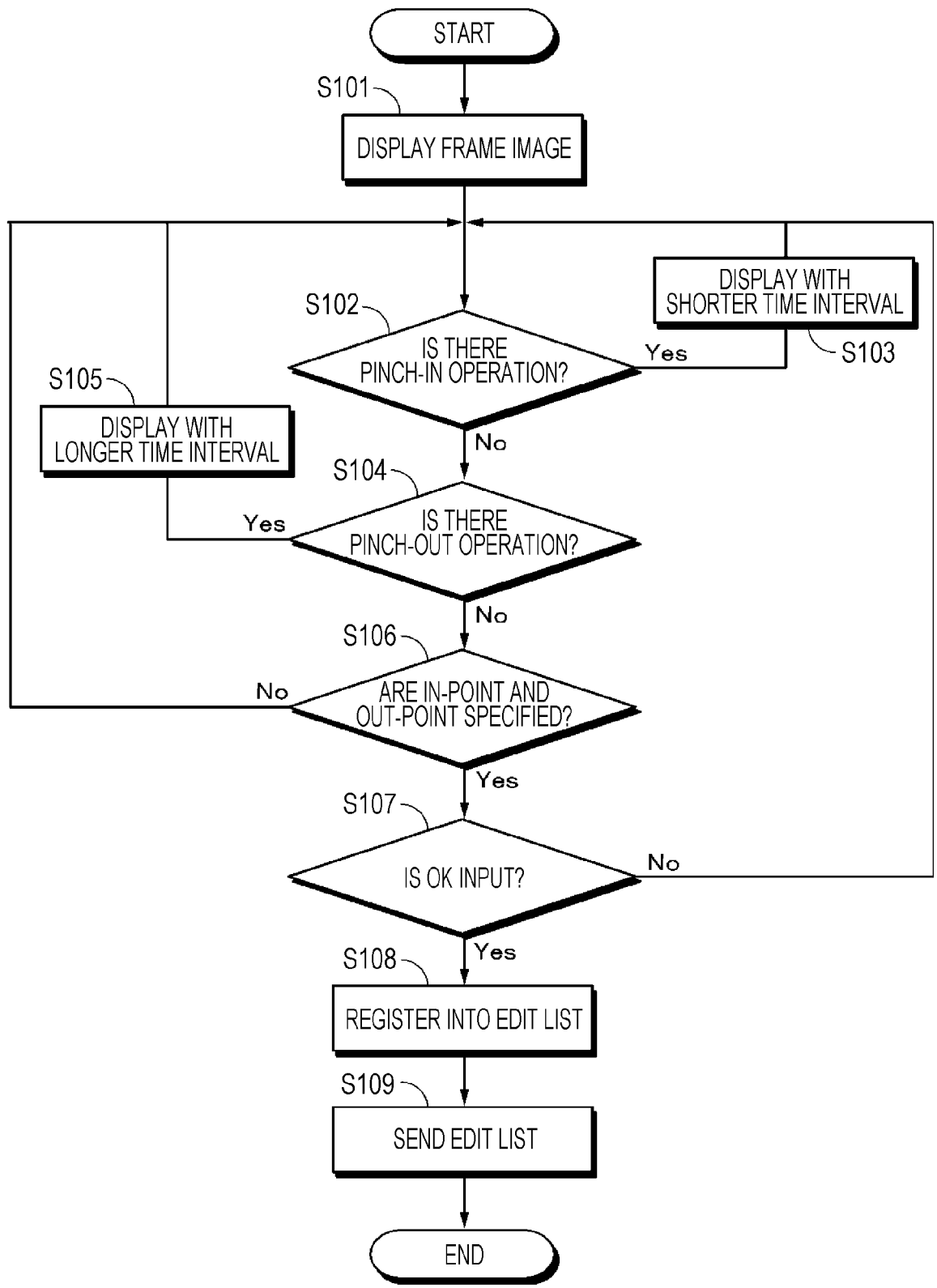
FIG. 9 is a flowchart showing a flow of processing using a terminal device.

FIG. 9 is a flowchart showing a flow of processing in the terminal device 200 described above. First, in step S101, frame images constituting a proxy moving image are displayed in the frame display area 300. Next, in step S102, it is determined whether or not a pinch-in operation has been performed by the user. In a case where a pinch-in operation has been performed by the user, the processing proceeds to step S103 (Yes in step S102). Further, in step S103, as described above, the frame images are displayed in a state where a time interval between the frame images is reduced.

In a case where a pinch-in operation has not been performed in step S102, the processing proceeds to step S104 (No in step S102). In step S104, it is determined whether or not a pinch-out operation has been performed by the user. In a case where a pinch-out operation has been performed by the user, the processing proceeds to step S105 (Yes in step S104). Further, in step S105, as described above, the frame images are displayed in a state where a time interval between the frame images is increased. Meanwhile, the order of step S102 and step S104 may be reversed.

In a case where a pinch-out operation has not been performed by the user in step S104, the processing proceeds to step S106 (No in step S104), and it is determined whether or not an in-point and an out-point have been designated by the user. In a case where an in-point and an out-point have not been input, step S102 to step S106 are repeated until an in-point and an out-point are designated (No in step S106).

In a case where an in-point and an out-point have been designated by the user in step S106, the processing proceeds to step S107 (Yes in step S106), and it is determined whether or not the user has performed an input to the decision button 304. In a case where an input has not been performed on the decision button 304, step S102 to step S106 are repeated until an input is performed (No in step S107).

In a case where the user has performed an input to the decision button 304, the processing proceeds to step S108 (Yes in step S107), and an in-point and an out-point are registered in an edit list. Further, in step S109, the edit list is transmitted from the terminal device 200 to the imaging device 100.

In this manner, a proxy file having a reduced data size is transmitted to the terminal device 200 used for moving image editing work by the user without transmitting and receiving the original moving image data itself, and thus it is possible to reduce a time required for the transmission and reception of data. Thereby, it is possible to reduce a time from moving image capturing to moving image editing work. In addition, since only an edit list is transmitted from the terminal device 200 used for moving image editing work by the user to the imaging device 100 performing a moving image editing process, it is also possible to reduce a time from the termination of the moving image editing work to the moving image editing process. Further, it is also possible to perform moving image editing work between the imaging device 100 and the terminal device 200 even under an environment where the speed of communication is low.

Meanwhile, for example, a long-press operation is performed on a desired frame image in a state where frame images constituting a proxy moving image are displayed in the frame display area 300, so that a moving image from the desired frame image to the next frame image may be reproduced. The reproduction may be performed on the frame image having been subjected to the long-press operation, or a transition to another screen may be performed so that reproduction is performed on the screen. In the reproduction of the moving image, a sound may also be reproduced at the same time.

2. Second Embodiment

[2-1. Configuration of Moving Image Editing System]

Figure 10:
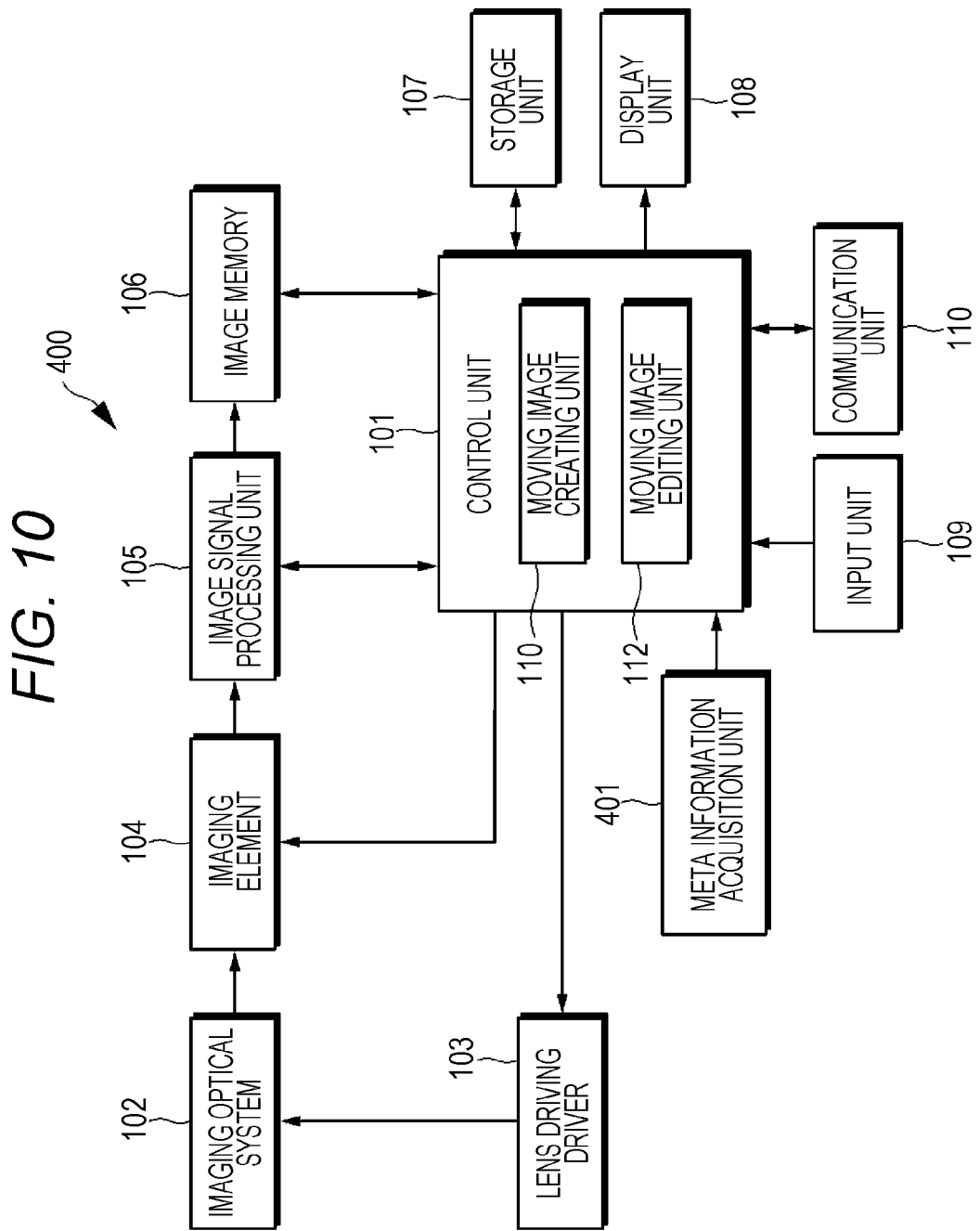
FIG. 10 is a block diagram showing a configuration of an imaging device in a second embodiment.

Next, a second embodiment of the present technology will be described. FIG. 10 is a block diagram of an imaging device 400 constituting a moving image editing system in the second embodiment. The imaging device 400 according to the second embodiment is different from the first embodiment in that the imaging device includes a meta information acquisition unit 401. Meanwhile, components other than the meta information acquisition unit 401 are similar to those in the first embodiment, and thus the description thereof will be omitted.

The meta information acquisition unit 401 acquires various pieces of meta information and supplies the acquired information to a moving image creating unit 112. Examples of the meta information include an elapsed time from the start of reproduction, an imaging time, subject recognition information, scene detection information, imaging position information, sound information, tag information, and the like.

In a case where the meta information is an elapsed time or an imaging time, the meta information acquisition unit 401 has a clocking function. In a case where the meta information is subject recognition information, the meta information acquisition unit 401 has a known subject recognition function. In a case where the meta information is scene detection information, the meta information acquisition unit 401 has a known scene detection function. In a case where the meta information is imaging position information, the meta information acquisition unit 401 has a position acquisition function such as a global positioning system (GPS). In a case where the meta information is sound information, the meta information acquisition unit 401 performs predetermined signal processing on a sound recorded by a microphone 111 to generate a sound of a moving image. In a case where the meta information is tag information, the meta information acquisition unit 401 has a function of receiving an input of a tag from a user.

The elapsed time from the start of reproduction of a moving image is information indicating a time elapsed from the start of the moving image with a time when the moving image is started set as "00:00". The imaging time is information indicating a time when the moving image is captured. The subject recognition information includes positional information of a person as a subject in the moving image who is recognized using known subject recognition technology, positional information of the face of the person, orientation information of the face of the person, facial expression information of the face of the person, pupil detection information, and the like. The scene detection information is information indicating a switching position (change point) of a scene in the moving image which is detected on the basis of colors, histograms, luminance, the movement of the subject, and the like in the moving image. The imaging position information includes latitude and longitude information indicating a position at which a moving image acquired by a GPS is captured, and the like Meanwhile, the meta information is not limited to the above-described information, and may be any information as long as the meta information is information related to a captured moving image.

The moving image creating unit 112 having received the meta information supplied from the meta information acquisition unit 401 adds the meta information supplied from the meta information acquisition unit to an original moving image file and a proxy file.

Further, in the terminal device 200, a decoding unit 204 decodes a proxy file transmitted from the imaging device 400 to create a proxy moving image, and frame images constituting the proxy moving image decoded by the decoding unit 204, sounds, and meta information are developed in a memory 205.

[2-2. Configuration of User Interface for Moving Image Editing]

Next, a user interface for moving image editing in the second embodiment will be described with reference to FIG. 11. In the second embodiment, in addition to a frame image, meta information corresponding to the frame image is displayed in a meta information display area 305. Meanwhile, an indicator 301, a scroll bar 302, a slider 303, and a decision button 304 are the same as those in a first display mode, and thus the description thereof will be omitted. In addition, the second embodiment is also similar to the first embodiment in that the moving image creating unit 112 creates a proxy file after the capturing of a moving image by the imaging device 100 is terminated, and the proxy file is transmitted to the terminal device 200.

Similarly to the first mode, a frame display area 300 is divided into a total of twelve areas of three areas in a vertical direction by four areas in a horizontal direction, and the meta information display area 305 for displaying meta information corresponding to a frame image is provided below each of the twelve areas.

In an example of FIG. 11A, elapsed time information indicating an elapsed time from the start of reproduction of a proxy moving image is displayed as meta information. The elapsed time information is set to be a mark for searching for a desired frame image, and thus it is possible to easily search for a desired frame image serving as an in-point or an out-point. A frame image to be displayed in the frame display area 300 is extracted on the basis of the meta information, and thus the user can search for a desired frame image from the meta information by viewing meta information.

In an example of FIG. 11B, subject recognition information and scene detection information are displayed as meta information. In FIG. 11B, information indicating whether or not a person is imaged, whether an image is captured indoors or outdoors, a time slot, and whether an image is bright or dark is displayed as the scene detection information.

In an example of FIG. 11C, as meta information, a sound of a proxy moving image is displayed as a waveform. Meanwhile, similarly to the first embodiment, frame images extracted at time intervals are displayed. However, regarding a sound waveform, all sound waveforms constituting a moving image are continuously displayed without interruption, inclusive of a sound waveform corresponding to a frame image which is not displayed. A sound waveform displayed below each frame image is a sound corresponding to a scene from the frame image to the next frame image.

Meanwhile, the location of a sound corresponding to a frame image displayed in a sound waveform is indicated by a mark 306. The sound waveform is displayed in this manner, and thus it is also possible to search for a desired frame image on the basis of a change in a sound in addition to displayed frame images.

In this manner, according to the second embodiment, in addition to frame images constituting a proxy moving image, meta information is also displayed in association with the frame images, and thus the user can perform moving image editing work while also referring to the meta information.

Meanwhile, a plurality of pieces of meta information may be displayed in the meta information display area 305. For example, both a sound waveform and an elapsed time from the start of reproduction are displayed in the meta information display area 305.

Figure 11:
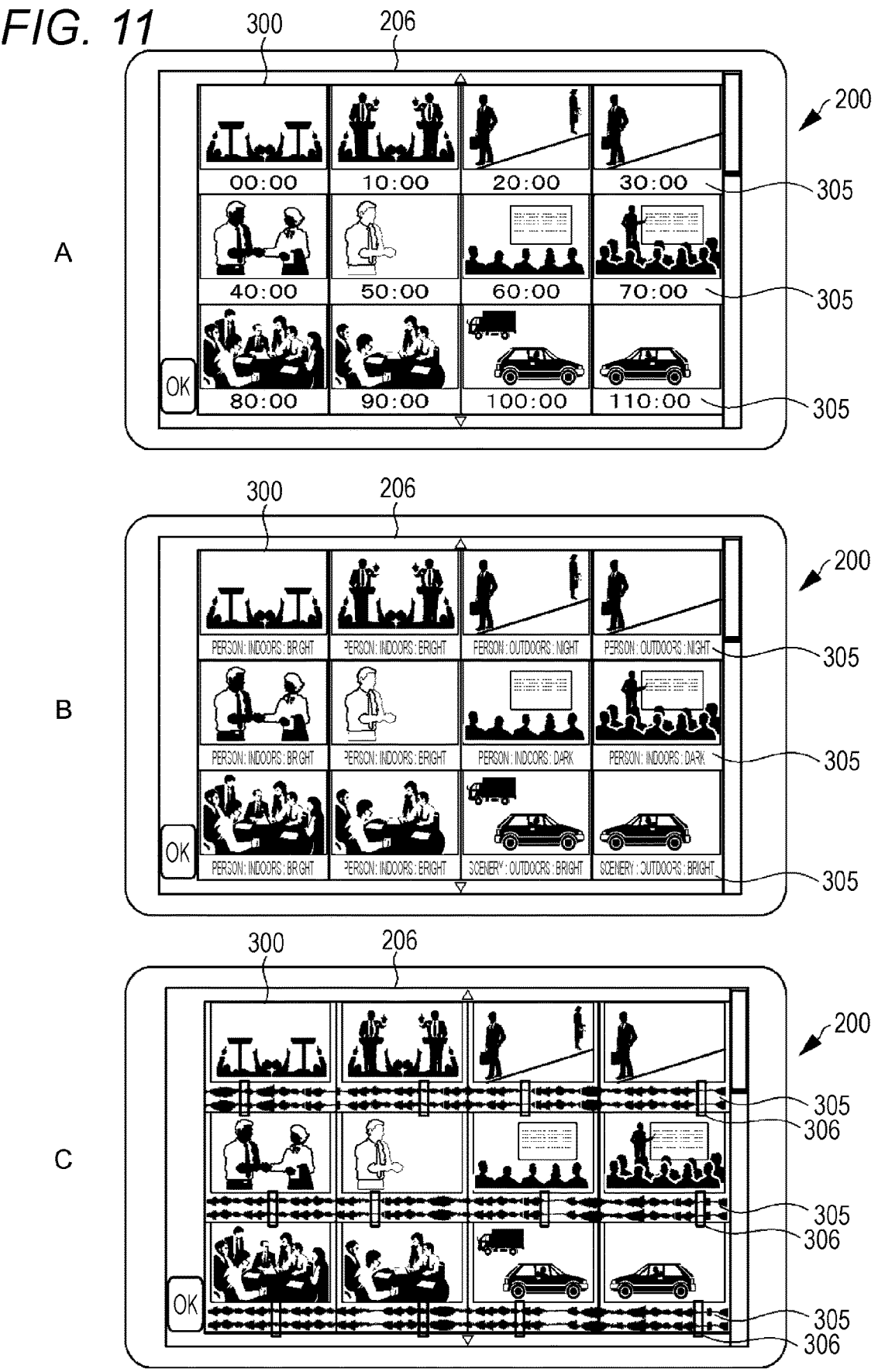
FIG. 11 is a diagram showing a configuration of a user interface for moving image editing in the second embodiment.

The meta information shown in FIG. 11 is merely an example, and the present technology is not limited to the display of only meta information.

3. Third Embodiment

[3-1. Configuration of Moving Image Editing System]

Next, a third embodiment of the present technology will be described. A moving image editing system according to the third embodiment includes a plurality of imaging devices 100 and one terminal device 200. The same subject or different subjects are simultaneously imaged by the plurality of imaging devices 100. Meanwhile, creating, transmission, reception, and the like of a proxy file are similar to those in the first embodiment or the second embodiment, and thus the description thereof will be omitted.

[3-2. Configuration of User Interface for Moving Image Editing]

Next, a user interface for moving image editing in the third embodiment will be described with reference to FIG. 12. The third embodiment is similar to the first embodiment in that a specific frame image among frame images constituting a proxy moving image is displayed in a frame display area 300. In addition, the second embodiment is also similar to the first embodiment in that the moving image creating unit 112 creates a proxy file after the capturing of a moving image by the imaging device 100 is terminated, and the proxy file is transmitted to the terminal device 200.

The third embodiment is different from the first embodiment in that frame images constituting a proxy moving image of each of moving images simultaneously captured by a plurality of (three in the present example) imaging devices 100 are displayed on a display unit 206 at the same time.

Figure 12:
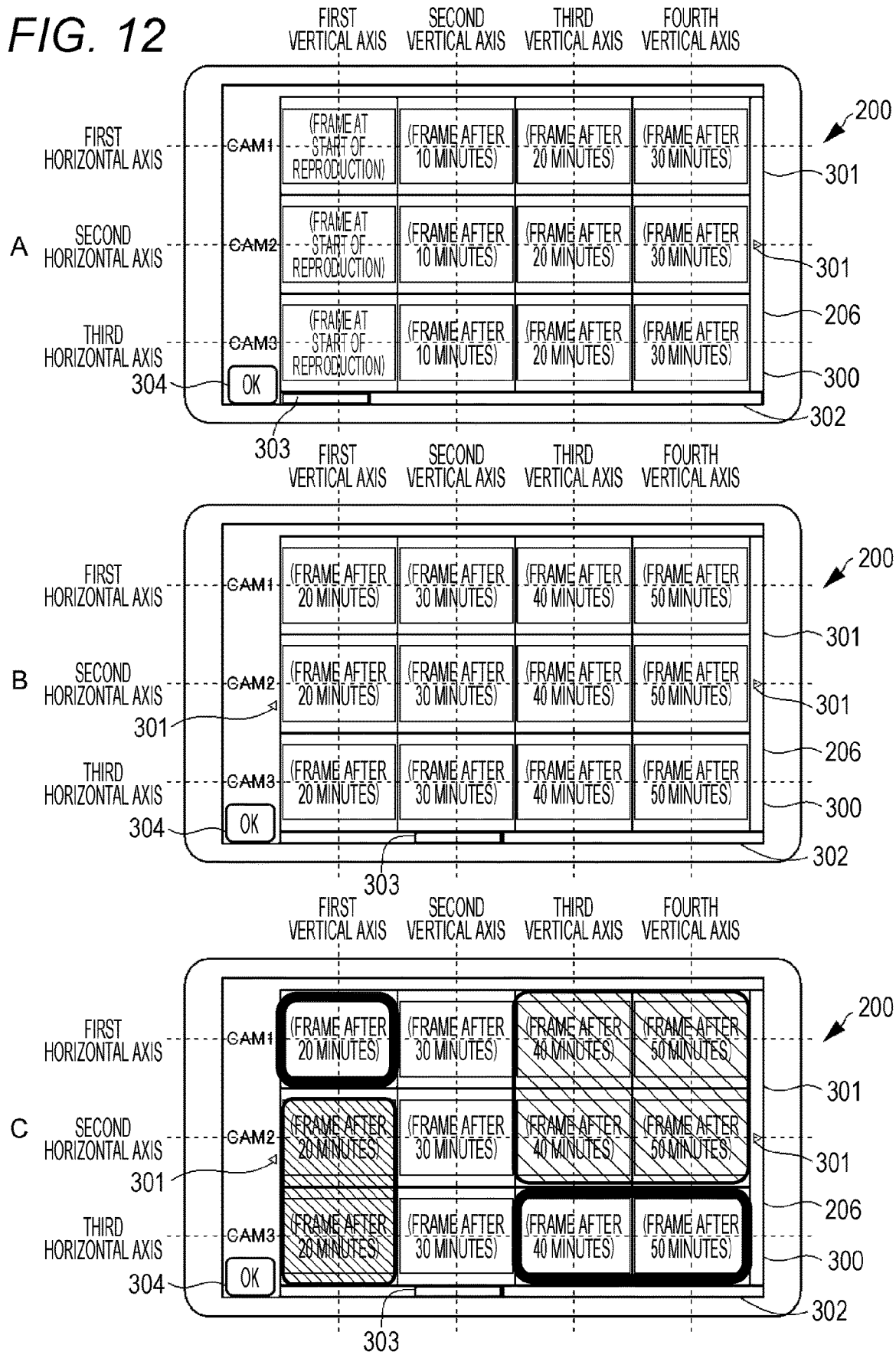
FIG. 12 is a diagram showing a configuration of a user interface for moving image editing in a third embodiment.

The frame display area 300 shown in FIG. 12 is divided into a total of twelve areas of three areas in a vertical direction by four areas in a horizontal direction, and an upper stage (first horizontal axis) is a first imaging device area in which frame images of a proxy moving image of a first imaging device are displayed. In addition, a middle stage (second horizontal axis) is a second imaging device area in which frame images of a proxy moving image of a second imaging device are displayed, and four areas in a lower stage (third horizontal axis) are configured as a third imaging device area in which frame images of a proxy moving image of a third imaging device are displayed.

The frame display area 300 is configured such that a time axis flows from the left to the right. Accordingly, an indicator 301 is displayed on the right and left sides of the display unit 206. Meanwhile, a function of the indicator 301 is similar to that in the first embodiment. In addition, a scroll bar 302 and a slider 303 are displayed below the display unit 206. Meanwhile, functions of the scroll bar 302 and the slider 303 are similar to those in the first embodiment. Accordingly, when the user scrolls the frame display area 300 by performing a swipe operation or a flick operation on a touch panel rightwards in the state shown in FIG. 12A, a state shown in FIG. 12B is set, and a new frame image (a frame image to be reproduced 50 minutes after the start of reproduction) is displayed.

Similarly to the first embodiment, all frame images constituting a proxy moving image are not displayed in the frame display area 300 in time series, and specific frame images extracted at predetermined time intervals are displayed side by side.

In the frame display area 300 shown in FIG. 12, the frame images of the proxy moving image obtained by the first imaging device are displayed at intervals of 10 minutes in the first imaging device area provided in the upper stage. In addition, the frame images of the proxy moving image obtained by the second imaging device are displayed at intervals of 10 minutes in the second imaging device area provided in the middle stage. Further, the frame images of the proxy moving image obtained by the third imaging device are displayed at intervals of 10 minutes in the third imaging device area provided in the lower stage.

In the frame display area 300, time axes of respective first to fourth vertical axes coincide with each other. That is, in the state shown in FIG. 12A, frame images at the start of imaging which are obtained by the first imaging device, the second imaging device, and the third imaging device are displayed on the first vertical axis, and frame images obtained 10 minutes after the start of imaging by the first imaging device, the second imaging device, and the third imaging device are displayed on the second vertical axis. Frame images obtained 20 minutes after the start of imaging by the first imaging device, the second imaging device, and the third imaging device are displayed on the third vertical axis, and frame images obtained 30 minutes after the start of imaging by the first imaging device, the second imaging device, and the third imaging device are displayed on the fourth vertical axis.

In the state shown in FIG. 12B, frame images obtained 20 minutes after the start of imaging by the first imaging device, the second imaging device, and the third imaging device are displayed on the first vertical axis, and frame images obtained 30 minutes after the start of imaging by the first imaging device, the second imaging device, and the third imaging device are displayed on the second vertical axis. Frame images obtained 40 minutes after the start of imaging by the first imaging device, the second imaging device, and the third imaging device are displayed on the third vertical axis, and frame images obtained 50 minutes after the start of imaging by the first imaging device, the second imaging device, and the third imaging device are displayed on the fourth vertical axis.

In this manner, frame images simultaneously captured by different imaging devices are displayed on the same time axis, and thus it is possible to easily ascertain a plurality of frame images simultaneously captured by the different imaging devices at a glance. Thereby, it is possible to improve the efficiency of editing of moving images captured by a plurality of imaging devices. In addition, there is no concern that a time axis of a moving image may be deviated in moving image editing.

In the third embodiment, in the case where an in-point and an out-point are designated, a frame image captured by another imaging device 100 and captured simultaneously with a frame image surrounded by a thick frame designated as an in-point or an out-point is displayed dark to indicate to the user that the frame image captured by another imaging device cannot be selected, as shown in FIG. 12C. Thereby, frame images simultaneously captured by different imaging devices 100 are not designated. Accordingly, a time axis of an edited moving image is not deviated, and it is possible to efficiently designate an in-point and an out-point.

According to the third embodiment, it is possible to create an edited moving image by selecting a desired scene from a plurality of moving images captured by a plurality of imaging devices at different angles. In addition, it is possible to edit a plurality of moving images captured by a plurality of imaging devices in a similar manner as the editing of a moving image captured by one camera. Further, it is possible to easily create one edited moving image from a plurality of moving images captured by a plurality of imaging devices.

Thus, the first to third embodiments according to the present technology are configured. According to the present technology, a proxy file with a reduced data size is transmitted to the terminal device 200 that performs moving image editing work by the user without transmitting and receiving the original moving image data itself, and thus it is possible to reduce a time required for transmission and reception of data. Thereby, it is possible to reduce a time from moving image capturing to moving image editing work.

Only a specific frame image is extracted and displayed without displaying all frame images constituting a proxy moving image on the display unit 206 of the terminal device 200, and thus the user can easily ascertain a configuration of the entire moving image, scene transition, and the like at a glance or by reducing the number of scroll operations of the frame display area 300. In addition, even in a long moving image, it is possible to search for an approximate desired scene in the moving image with a small number of scroll operations.

Meanwhile, time intervals between frame images shown in FIG. 4, FIG. 5, FIG. 6, FIG. 7, and FIG. 12 are merely examples which are set for convenience of description, and the present technology is not limited to such time intervals.

The present technology can be used in various fields. A first use mode is a case where recording is performed by news coverage in a country or a region with a bad network environment. In this case, it takes a long time to transmit all pieces of original recorded moving image data from an imaging site to a broadcasting station as they are. Consequently, it is possible to reduce a time required from the termination of imaging to broadcasting by performing moving image editing at the imaging site using the present technology and transmitting edited moving image data with a reduced file size to the broadcasting station.

A second use mode is a case where a lawyer desires to obtain only an evidential part of a moving image as a trial document or the like. In a case where a moving image takes a long time, it will take a long time for a lawyer to download the entire moving image for editing, and the cost of a service used for downloading will also be increased. Consequently, the lawyer downloads only a proxy file with a reduced file size to designate only a necessary part and downloads an edited moving image by using the present technology, and thus it is possible to reduce a downloading time and costs.

A third use mode is a case where a moving image is captured with a family member, a friend, or the like. For example, in a case where a moving image of a child is captured for a long time, the moving image once stored in a personal computer or the like may be left unedited. Consequently, since editing can be performed by the terminal device 200 on the spot immediately after the termination of imaging by using the present technology, moving image editing can be performed more readily.

A fourth use mode is a case of imaging using a wearable camera mounted on a handle of a bicycle or a motorcycle or at a tip of a surfboard or a snowboard and capable of performing imaging while moving. In such imaging, even in a case where a captured moving image lasts for a long time, there are only few decisive moments in many cases. Consequently, it is possible to perform editing by the terminal device 200 immediately after imaging by using the present technology and to reduce a time from the termination of recording to sharing with friends or acquaintances and uploading on SNS.

A fifth use mode is a case where a moving image captured by a drive recorder and a moving image captured by a monitoring camera are edited. These moving images have a long recording time in many cases, and thus it is possible to efficiently perform editing by using the present technology.

4. Application Example

The technology according to the present disclosure can be applied to various products. For example, the technology according to the present disclosure may be applied to a surgery room system.

Figure 13:
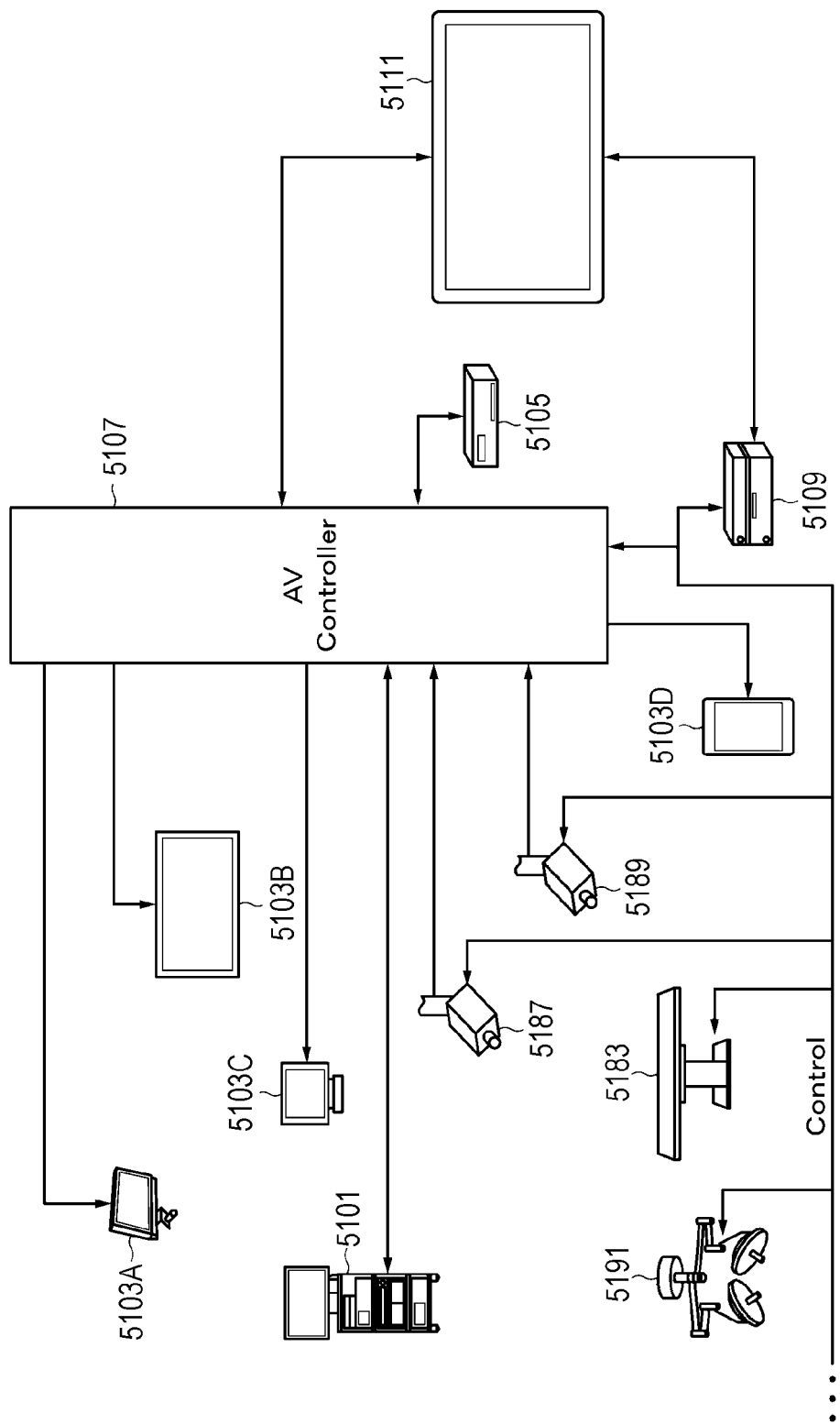
FIG. 13 is a view schematically illustrating a general configuration of an operating room system.

FIG. 13 is a view schematically illustrating a general configuration of an operating room system 5100 to which the technology according to an embodiment of the present disclosure can be applied. Referring to FIG. 13, the operating room system 5100 is configured such that a group of apparatus installed in an operating room are connected for cooperation with each other through an audiovisual (AV) controller 5107 and an operating room controlling apparatus 5109.

In the operating room, various apparatus may be installed. In FIG. 13, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are illustrated. The ceiling camera 5187 is provided on the ceiling of an operating room and images the hands of a surgeon. The surgery field camera 5189 is provided on the ceiling of the operating room and images a state of the entire operating room.

Here, among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the operating room separately from the endoscopic surgery system 5113. The apparatus which do not belong to the endoscopic surgery system 5113 are referred to also as non-medical equipment. The audiovisual controller 5107 and/or the operating room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the operating room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body cavity of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire operating room may be transmitted as display information. It is to be noted that, if a different apparatus having an imaging function exists in the operating room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example illustrated, the display apparatus 5103A is a display apparatus installed so as to be suspended from the ceiling of the operating room; the display apparatus 5103B is a display apparatus installed on a wall face of the operating room; the display apparatus 5103C is a display apparatus installed on a desk in the operating room; and the display apparatus 5103D is a mobile apparatus (for example, a tablet personal computer (PC)) having a display function.

Further, though not illustrated in FIG. 13, the operating room system 5100 may include an apparatus outside the operating room. The apparatus outside the operating room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The operating room controlling apparatus 5109 integrally controls processes other than processes relating to image display on the non-medical equipment. For example, the operating room controlling apparatus 5109 controls driving of the patient bed 5183, the ceiling camera 5187, the surgery field camera 5189 and the illumination 5191.

In the operating room system 5100, a centralized operation panel 5111 is provided such that it is possible to issue an instruction regarding image display to the audiovisual controller 5107 or issue an instruction regarding operation of the non-medical equipment to the operating room controlling apparatus 5109 through the centralized operation panel 5111. The centralized operation panel 5111 is configured by providing a touch panel on a display face of a display apparatus.

Figure 14:
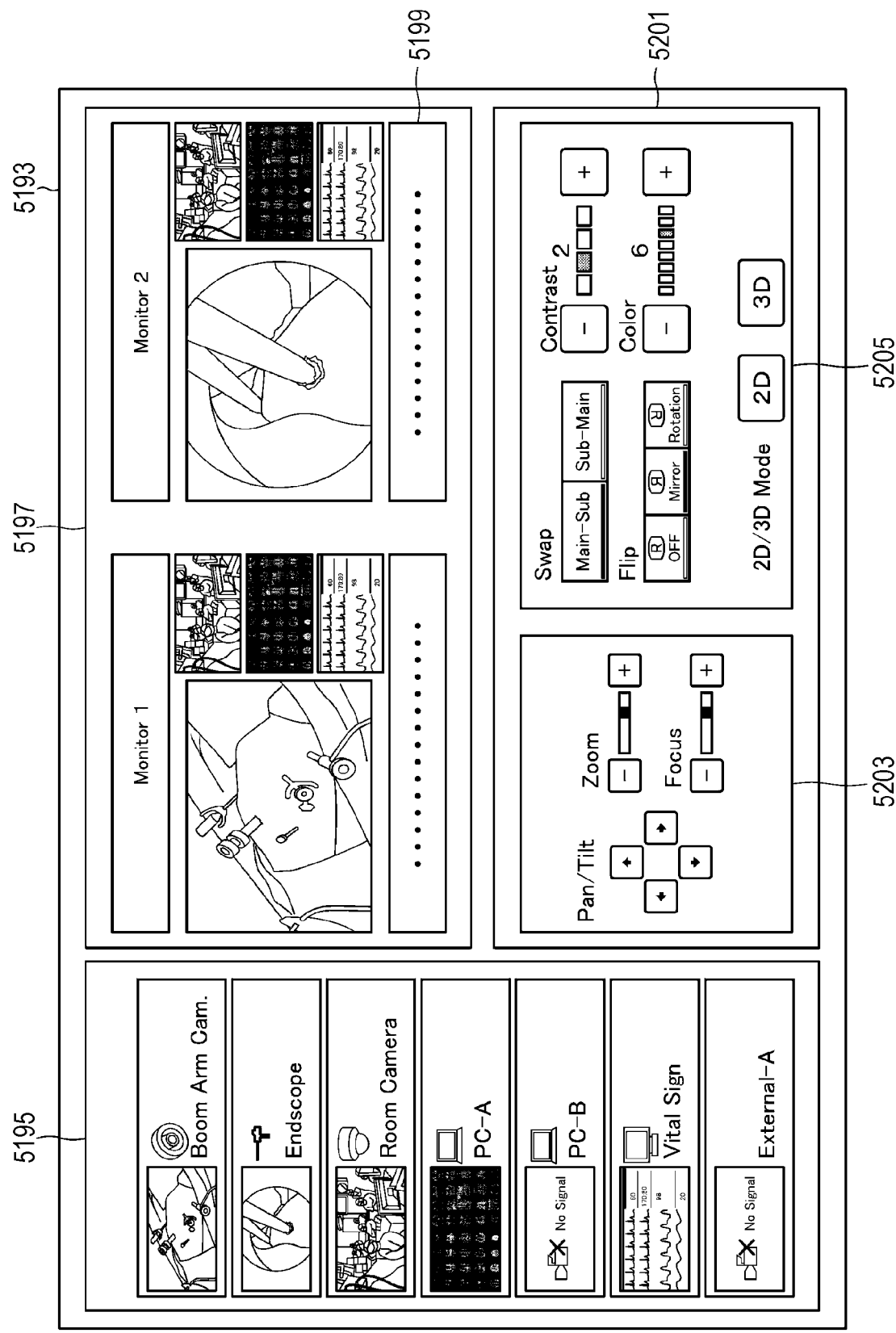
FIG. 14 is a view illustrating an example of display of an operation screen image of a centralized operation panel.

FIG. 14 is a view illustrating an example of display of an operation screen image on the centralized operation panel 5111. In FIG. 14, as an example, an operation screen image is illustrated which corresponds to a case in which two display apparatus are provided as apparatus of an output destination in the operating room system 5100. Referring to FIG. 14, the operation screen image 5193 includes a sending source selection region 5195, a preview region 5197 and a control region 5201.

In the sending source selection region 5195, the sending source apparatus provided in the operating room system 5100 and thumbnail screen images representative of display information which the sending source apparatus has are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example illustrated, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example illustrated, GUI parts for performing various operations for a camera (panning, tilting and zooming) in an apparatus of a sending source having an imaging function are provided in the sending source operation region 5203. The user can control operation of the camera of an apparatus of a sending source by suitably selecting any of the GUI parts. It is to be noted that, though not illustrated, in a case where the apparatus of a sending source selected in the sending source selection region 5195 is a recorder (namely, in a case where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the illustrated example, and the user may be able to perform operation inputting to each apparatus which can be controlled by the audiovisual controller 5107 and the operating room controlling apparatus 5109 provided in the operating room system 5100 through the centralized operation panel 5111.

Figure 15:
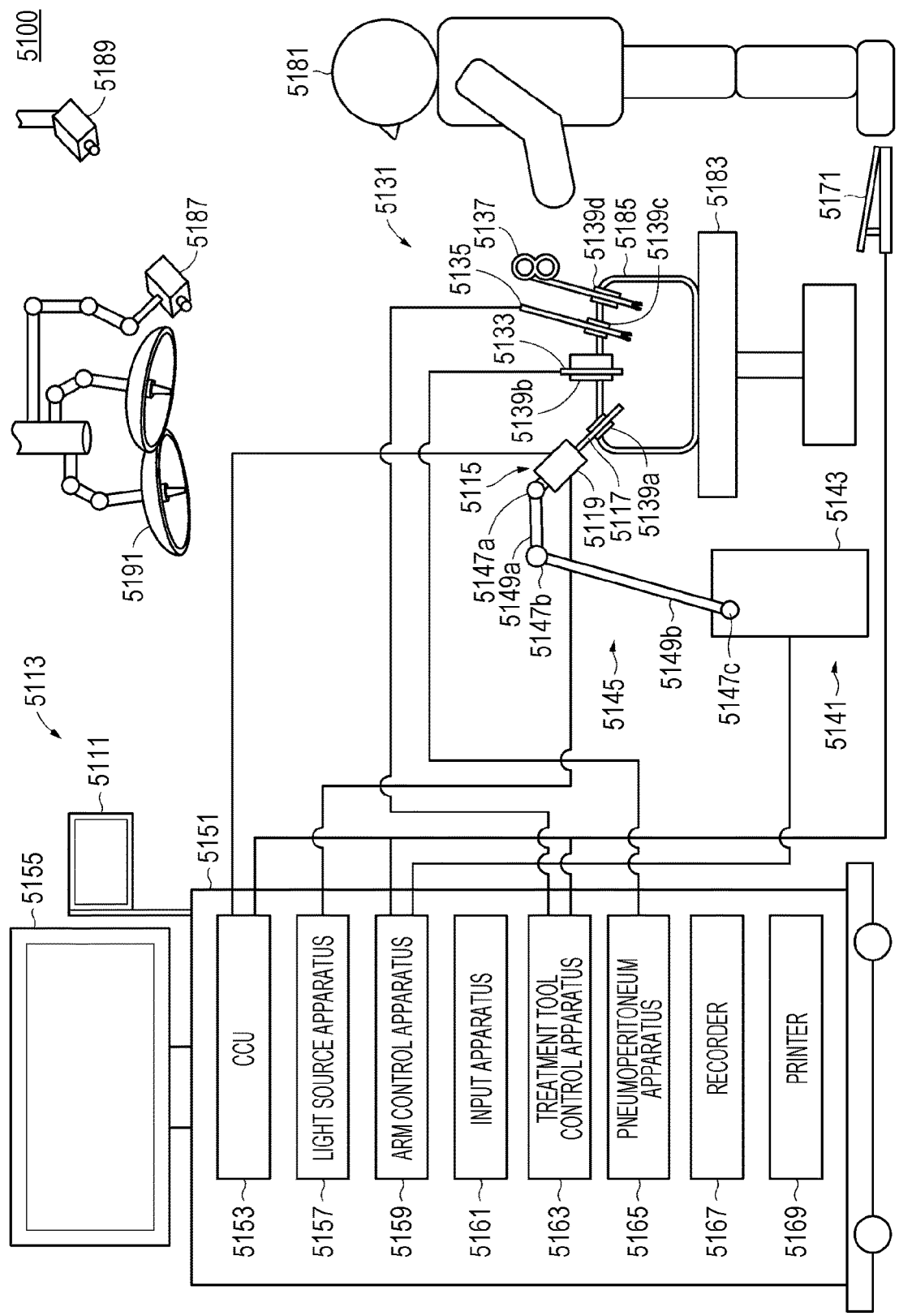
FIG. 15 is a view illustrating an example of a state of surgery to which the operating room system is applied.

FIG. 15 is a view illustrating an example of a state of surgery to which the operating room system described above is applied. The ceiling camera 5187 and the surgery field camera 5189 are provided on the ceiling of the operating room such that it can image the hands of a surgeon (medical doctor) 5181 who performs treatment for an affected area of a patient 5185 on the patient bed 5183 and the entire operating room. The ceiling camera 5187 and the surgery field camera 5189 may include a magnification adjustment function, a focal distance adjustment function, an imaging direction adjustment function and so forth. The illumination 5191 is provided on the ceiling of the operating room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the operating room controlling apparatus 5109 (not illustrated in FIG. 15) as illustrated in FIG. 13. The centralized operation panel 5111 is provided in the operating room, and the user can suitably operate the apparatus existing in the operating room through the centralized operation panel 5111 as described hereinabove.

In the following, a configuration of the endoscopic surgery system 5113 is described in detail. As illustrated, the endoscopic surgery system 5113 includes an endoscope 5115, other surgical tools 5131, a support arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body cavity of the patient 5185 through the trocars 5139a to 5139d. In the example illustrated, as the other surgical tools 5131, a pneumoperitoneum tube 5133, an energy device 5135 and forceps 5137 are inserted into body cavity of the patient 5185. Further, the energy device 5135 is a treatment tool for performing incision and peeling of a tissue, sealing of a blood vessel or the like by high frequency current or ultrasonic vibration. However, the surgical tools 5131 illustrated are mere examples at all, and as the surgical tools 5131, various surgical tools which are generally used in endoscopic surgery such as, for example, tweezers or a retractor may be used.

An image of a surgical region in a body cavity of the patient 5185 picked up by the endoscope 5115 is displayed on a display apparatus 5155. The surgeon 5181 would use the energy device 5135 or the forceps 5137 while watching the image of the surgical region displayed on the display apparatus 5155 on the real time basis to perform such treatment as, for example, resection of an affected area. It is to be noted that, though not illustrated, the pneumoperitoneum tube 5133, the energy device 5135, and the forceps 5137 are supported by the surgeon 5181, an assistant or the like during surgery.

(Support Arm Apparatus)

The support arm apparatus 5141 includes an arm unit 5145 extending from a base unit 5143. In the example illustrated, the arm unit 5145 includes joint units 5147a, 5147b and 5147c and links 5149a and 5149b and is driven under the control of an arm control apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a certain length from a distal end thereof to be inserted into a body cavity of the patient 5185, and a camera head 5119 connected to a proximal end of the lens barrel 5117. In the example illustrated, the endoscope 5115 is illustrated as a rigid endoscope having the lens barrel 5117 of the hard type. However, the endoscope 5115 may otherwise be configured as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body cavity of the patient 5185 through the objective lens. It is to be noted that the endoscope 5115 may be a forward-viewing endoscope or may be an oblique-viewing endoscope or a side-viewing endoscope.

An optical system and an imaging element are provided in the inside of the camera head 5119 such that reflected light (observation light) from an observation target is condensed on the imaging element by the optical system. The observation light is photo-electrically converted by the imaging element to generate an electric signal corresponding to the observation light, namely, an image signal corresponding to an observation image. The image signal is transmitted as RAW data to a camera control unit (CCU) 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of imaging elements may be provided on the camera head 5119. In this case, a plurality of relay optical systems are provided in the inside of the lens barrel 5117 in order to guide observation light to the plurality of respective imaging elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 illustrated in FIG. 13 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information regarding an imaging condition such as a magnification or a focal distance. The information regarding an imaging condition may be inputted through the input apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like, for example, and/or ready for 3D display, then a display apparatus by which corresponding display of the high resolution and/or 3D display are possible may be used as the display apparatus 5155. In a case where the apparatus is ready for imaging of a high resolution such as 4K or 8K, if the display apparatus used as the display apparatus 5155 has a size of not less than 55 inches, then a more immersive experience can be obtained. Further, depending on the application, a plurality of display apparatus 5155 having different resolutions and/or different sizes may also be provided.

The light source apparatus 5157 includes a light source such as, for example, a light emitting diode (LED) and supplies irradiation light for imaging of a surgical region to the endoscope 5115.

The arm control apparatus 5159 includes a processor such as a CPU, for example, and operates in accordance with a certain program to control driving of the arm unit 5145 of the support arm apparatus 5141 in accordance with a certain controlling method.

An input apparatus 5161 is an input interface for the endoscopic surgery system 5113. A user can perform inputting of various kinds of information or instruction inputting to the endoscopic surgery system 5113 through the input apparatus 5161. For example, the user would input various kinds of information relating to surgery such as physical information of a patient, information regarding a surgical procedure of the surgery and so forth through the input apparatus 5161. Further, the user would input, for example, an instruction to drive the arm unit 5145, an instruction to change an imaging condition (type of irradiation light, magnification, focal distance or the like) by the endoscope 5115, an instruction to drive the energy device 5135 or a like through the input apparatus 5161.

The type of the input apparatus 5161 is not limited and may be that of any one of various known input apparatus. As the input apparatus 5161, for example, a mouse, a keyboard, a touch panel, a switch, a foot switch 5171 and/or a lever or the like may be applied. In a case where a touch panel is used as the input apparatus 5161, it may be provided on the display face of the display apparatus 5155.

The input apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the input apparatus 5161 includes a camera which can detect a motion of a user, and various kinds of inputting are performed in response to a gesture or a line of sight of a user detected from a video picked up by the camera. Further, the input apparatus 5161 includes a microphone which can collect the voice of a user, and various kinds of inputting are performed by voice through the microphone. By configuring the input apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the user convenience is improved.

A treatment tool control apparatus 5163 controls driving of the energy device 5135 for cautery or incision of a tissue, sealing of a blood vessel or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Support Arm Apparatus)

The support arm apparatus 5141 includes the base unit 5143 serving as a base, and the arm unit 5145 extending from the base unit 5143. In the example illustrated, the arm unit 5145 includes the plurality of joint units 5147a, 5147b and 5147c and the plurality of links 5149a and 5149b connected to each other by the joint unit 5147b. In FIG. 15, for simplified illustration, the configuration of the arm unit 5145 is illustrated in a simplified form. Actually, the shape, number and arrangement of the joint units 5147a to 5147c and the links 5149a and 5149b and the direction and so forth of axes of rotation of the joint units 5147a to 5147c can be set suitably such that the arm unit 5145 has a desired degree of freedom. For example, the arm unit 5145 may preferably be configured such that it has a degree of freedom not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body cavity of the patient 5185.

An actuator is provided in the joint units 5147a to 5147c, and the joint units 5147a to 5147c are configured to be rotatable about a certain rotational axis in accordance with the driving of the respective actuator. The driving of the actuator is controlled by the arm control apparatus 5159 to control the rotational angle of each of the joint units 5147a to 5147c thereby to control driving of the arm unit 5145. Consequently, control of the position and the posture of the endoscope 5115 can be implemented. At this point, the arm control apparatus 5159 can control driving of the arm unit 5145 by various known controlling methods such as force control or position control.

For example, if the surgeon 5181 suitably performs operation inputting through the input apparatus 5161 (including the foot switch 5171), then driving of the arm unit 5145 may be controlled suitably by the arm control apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the input apparatus 5161 which is placed at a place remote from the operating room.

Further, in a case where force control is applied, the arm control apparatus 5159 may perform so-called power-assisted control to drive the actuators of the joint units 5147a to 5147c such that the arm unit 5145 may receive external force by the user and move smoothly following the external force. With this arrangement, when the user moves the arm unit 5145 while touching the arm unit 5145 directly, the arm unit 5145 can be moved with comparatively weak force. Accordingly, it becomes possible for the user to move the endoscope 5115 more intuitively with a simpler and easier operation, and user convenience can be improved.

Here, generally in endoscopic surgery, the endoscope 5115 is supported by a medical doctor called scopist. In contrast, where the support arm apparatus 5141 is used, the position of the endoscope 5115 can be fixed with a higher degree of certainty without hands, and therefore, an image of a surgical region can be obtained stably and surgery can be performed smoothly.

It is to be noted that the arm control apparatus 5159 may not necessarily be provided on the cart 5151. Further, the arm control apparatus 5159 may not necessarily be a single apparatus. For example, the arm control apparatus 5159 may be provided in each of the joint units 5147a to 5147c of the arm unit 5145 of the support arm apparatus 5141 such that the multiple of arm control apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the imaging elements of the camera head 5119 is controlled in synchronism with the irradiation timings, then images individually corresponding to the R, G and B colors can be picked up time-divisionally. According to the method just described, a color image can be obtained even if a color filter is not provided for the imaging element.

Further, driving of the light source apparatus 5157 may be controlled such that the intensity of light to be outputted is changed for each certain time. By controlling driving of the imaging element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a certain wavelength band ready for special light observation. In special light observation, for example, by utilizing the wavelength dependency of absorption of light of a body tissue, narrow band light observation (narrow band imaging) of imaging a certain tissue such as a blood vessel of a superficial portion of the mucous membrane or the like in a high contrast is performed by applying light of a narrower wavelength band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 16:
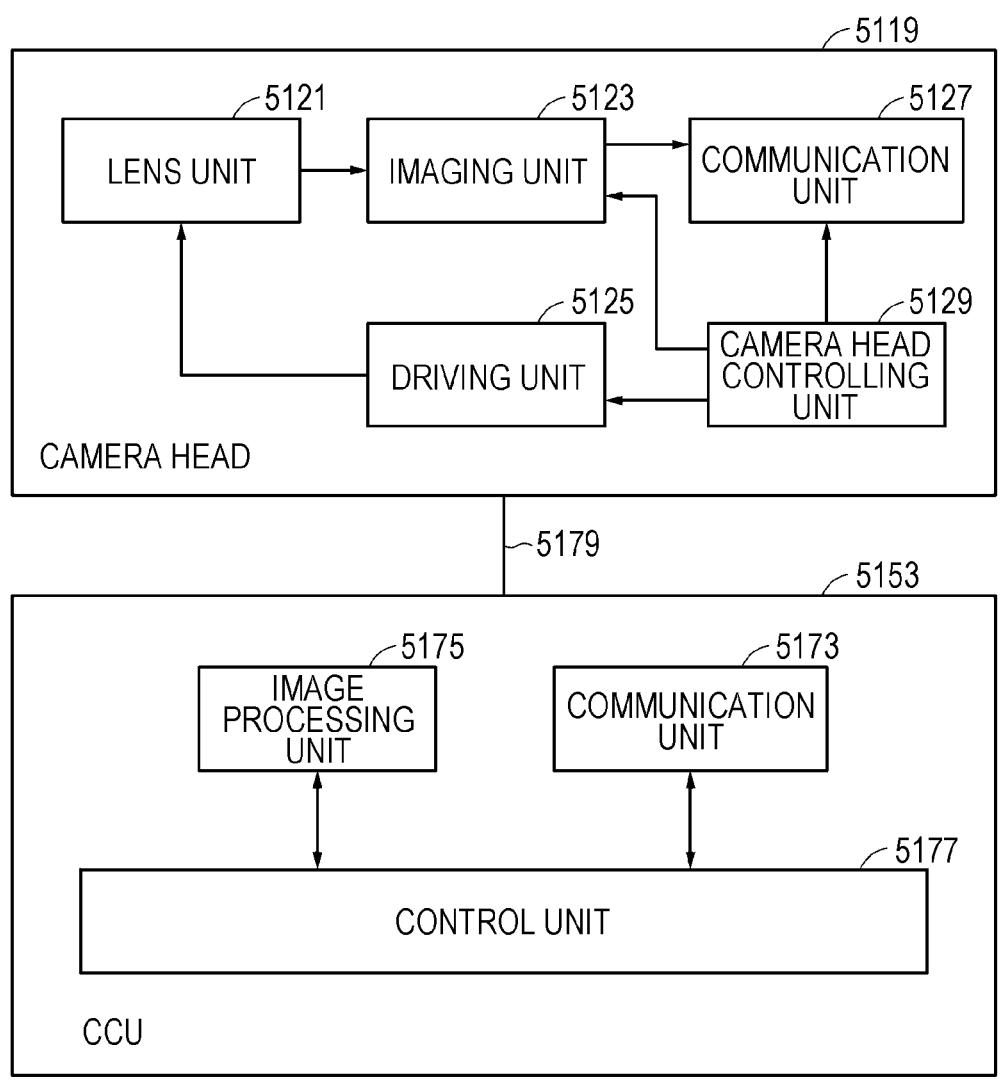
FIG. 16 is a block diagram illustrating an example of a functional configuration of a camera head and a camera control unit (CCU) illustrated in FIG. 15.
Figure 18:
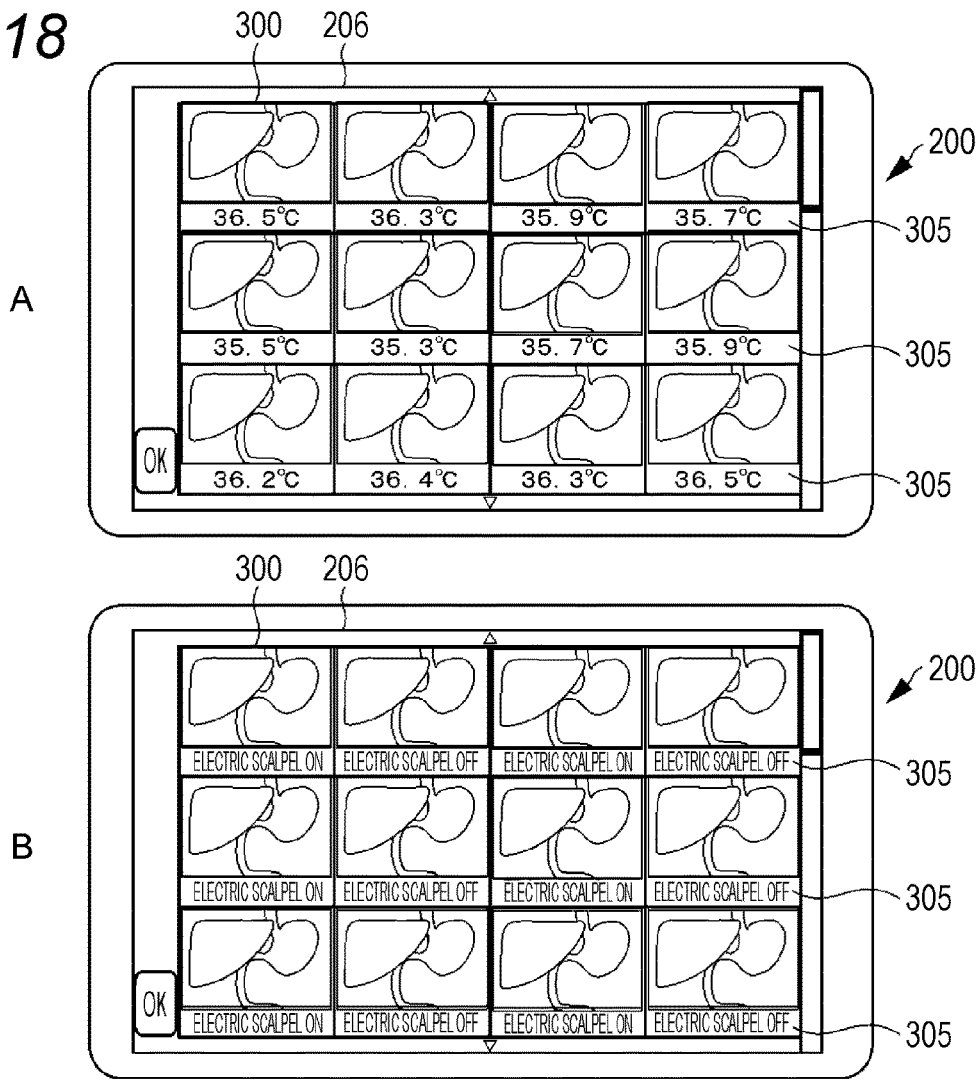
FIG. 18 is a diagram showing display modes of frame images of a moving image captured in an operating room system and meta information.

Functions of the camera head 5119 of the endoscope 5115 and the CCU 5153 are described in more detail with reference to FIG. 16. FIG. 16 is a block diagram illustrating an example of a functional configuration of the camera head 5119 and the CCU 5153 illustrated in FIG. 15.

Referring to FIG. 16, the camera head 5119 has, as functions thereof, a lens unit 5121, an imaging unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the imaging element of the imaging unit 5123. Further, the zoom lens and the focusing lens are configured such that the positions thereof on their optical axis are movable for adjustment of the magnification and the focal point of a picked up image.

The imaging unit 5123 includes an imaging element and disposed at a succeeding stage to the lens unit 5121. Observation light having passed through the lens unit 5121 is condensed on the light receiving face of the imaging element, and an image signal corresponding to the observation image is generated by photoelectric conversion. The image signal generated by the imaging unit 5123 is provided to the communication unit 5127.

As the imaging element which is included by the imaging unit 5123, an image sensor, for example, of the complementary metal oxide semiconductor (CMOS) type is used which has a Bayer array and is capable of picking up an image in color. It is to be noted that, as the imaging element, an imaging element may be used which is ready, for example, for imaging of an image of a high resolution not less than 4K. If an image of a surgical region is obtained in a high resolution, then the surgeon 5181 can comprehend a state of the surgical region in enhanced details and can proceed with the surgery more smoothly.

Further, the imaging element which is included by the imaging unit 5123 is configured such that it has a pair of imaging elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the imaging unit 5123 is configured as that of the multi-plate type, then a plurality of systems of lens units 5121 are provided corresponding to the individual imaging elements of the imaging unit 5123.

In addition, the imaging unit 5123 may not necessarily be provided on the camera head 5119. For example, the imaging unit 5123 may be provided just behind the objective lens in the inside of the lens barrel 5117.

The driving unit 5125 includes an actuator and moves the zoom lens and the focusing lens of the lens unit 5121 by a certain distance along the optical axis under the control of the camera head controlling unit 5129. Consequently, the magnification and the focal point of a picked up image by the imaging unit 5123 can be adjusted suitably.

The communication unit 5127 includes a communication apparatus for transmitting and receiving various kinds of information to and from the CCU 5153. The communication unit 5127 transmits an image signal acquired from the imaging unit 5123 as RAW data to the CCU 5153 through the transmission cable 5179. At this point, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. In a case where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information regarding imaging conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the imaging conditions such as the frame rate, exposure value, magnification or focal point are set automatically by the control unit 5177 of the CCU 5153 on the basis of an acquired image signal. In other words, a so-called auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the imaging element of the imaging unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may further include a function for storing information for identifying of the lens barrel 5117 and/or the camera head 5119.

It is to be noted that, by disposing the components such as the lens unit 5121 and the imaging unit 5123 in a sealed structure having high airtightness and high waterproofness, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. At this point, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a certain program, the image processes and the detection process described above can be performed. It is to be noted that, in a case where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. At this point, if imaging conditions are inputted by the user, then the control unit 5177 generates a control signal on the basis of the input by the user. Alternatively, in a case where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. At this point, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example illustrated in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the operating room. Therefore, such a situation that movement of medical staff in the operating room is disturbed by the transmission cable 5179 can be eliminated.

An example of the operating room system 5100 to which the technology according to an embodiment of the present disclosure can be applied has been described above. It is to be noted here that, although a case in which the medical system to which the operating room system 5100 is applied is the endoscopic surgery system 5113 has been described as an example, the configuration of the operating room system 5100 is not limited to that of the example described above. For example, the operating room system 5100 may be applied to a soft endoscopic system for inspection or a microscopic surgery system in place of the endoscopic surgery system 5113.

The technology according to the present disclosure can also be suitably applied to the display of information related to a surgical operation among the above-described application examples. Examples of the information related to the surgical operation include phase information of the surgical operation. The phase indicates a stage in the surgical operation. In the surgical operation, information on what a doctor does in each phase is usually registered in the operating room system 5100 in advance, and a surgical operation is performed according to the contents of the phase.

In a state where a surgical operation is being imaged, a user (a doctor or the like who performs the surgical operation) can perform an input to the foot switch 5171 at the time of moving from one phase of the surgical operation to the next phase during the surgical operation to add phase information as meta information to a moving image.

Further, in a case where a camera head (also referred to as a camera headset, a wearable camera, or the like) used during the surgical operation by the user includes an assignable button, it may be possible to add phase information as meta information to a moving image by performing an input to the assignable button.

In addition, after a proxy file is transmitted from the operating room system 5100 to the terminal device 200 after the termination of the surgical operation, phase information is displayed in the meta information display area 305 together with frame images in the frame display area 300 as shown in FIGS. 17A and 17B in moving image editing using the terminal device 200. Thereby, the user can designate an in-point and an out-point while referring to the phase information. Meanwhile, as shown in FIG. 17A, one frame image may be displayed for each phase, or the same phase may be displayed in a plurality of frame images as shown in FIG. 17B in accordance with the length of a phase, the state of a subject in the phase, and the like.

In addition, as the information related to the surgical operation, vital information regarding a patient undergoing the surgical operation, for example, a blood pressure, a pulse, a breathing rate, a heart rate, a body temperature, brain waves, and the like of the patient during the surgical operation may be added to the moving image as meta information, and the vital information may be displayed together with the frame images in the frame display area as shown in FIG. 17B.

Further, as the information related to the surgical operation, the use state of medical devices, for example, information on the turn-on and turn-off of an electric scalpel may be added to a moving image as meta information, and the information on the turn-on and turn-off of the electric scalpel may be displayed together with the frame images in the frame display area as shown in FIG. 17C.

Figure 19:
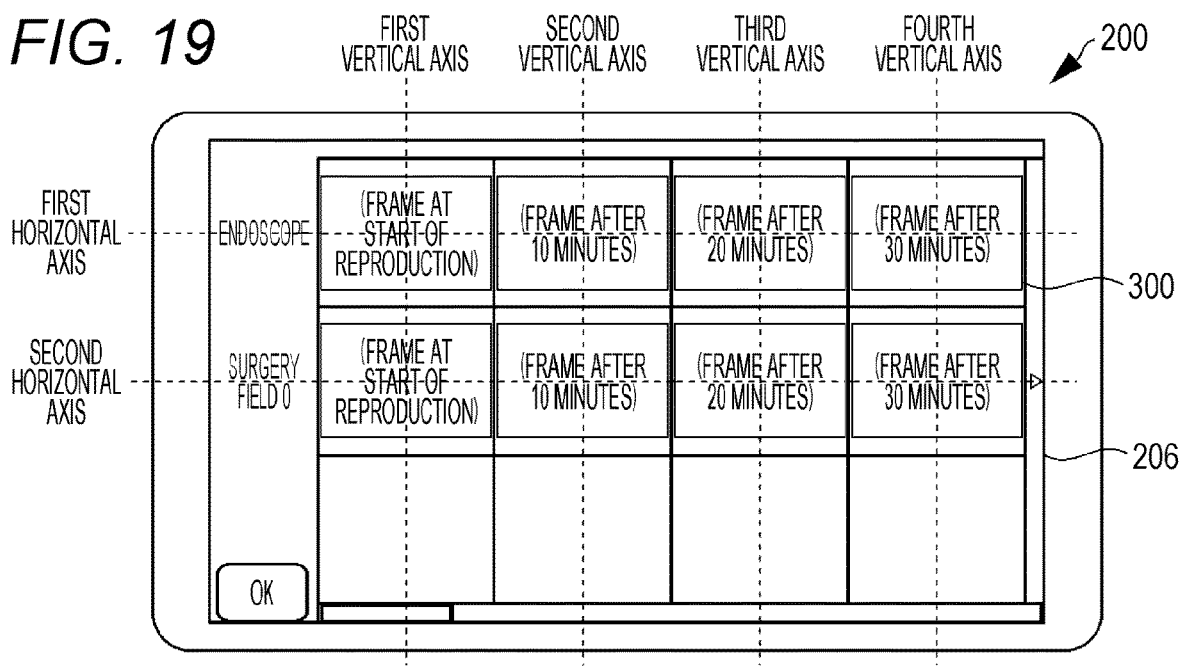
FIG. 19 is a diagram showing a display mode of frame images of a plurality of moving images captured in an operating room system.

In the above-described third embodiment, an example in which moving images simultaneously captured by a plurality of imaging devices are displayed side by side in one frame display area has been described. This display mode can also be applied to the above-described operating room system 5100. For example, as shown in FIG. 19, a moving image captured by the endoscope 5115 is displayed on a first horizontal axis in an upper stage, and a moving image captured by the surgery field camera 5189 is displayed on a second horizontal axis in a lower stage.

5. Modification Example

Although the embodiments of the present technology have been specifically described, the present technology is not limited to the above-described embodiments, and various modifications based on the technical idea of the present technology can be made.

In the embodiments, specific frame images extracted at predetermined time intervals are displayed side by side in the frame display area 300, but frame images extracted on the basis of a standard other than a time interval may be displayed. For example, a first frame image of each scene detected in accordance with a scene detection function may be displayed.

An input for instructing the change in a time interval between frame images described in the embodiment is not limited to a pinch-in operation and a pinch-out operation. For example, a time interval between frame images may be reduced in accordance with a double tap input, and a time interval between frame images may be increased in accordance with a triple tap input. Further, in a case where a touch panel can detect a pressing force of an operating finger or the like, a time interval between frame images may be changed depending on the magnitude of the pressing force.

In a case where a plurality of frame images are displayed in the frame display area 300, the user may display only a frame image designated through an input with high resolution and may roughly display the other frame images with low resolution. Thereby, the user can view only parts that the user wants to see in detail while ascertaining a configuration and a flow of a moving image from frame images displayed in the frame display area 300.

Figure 20:
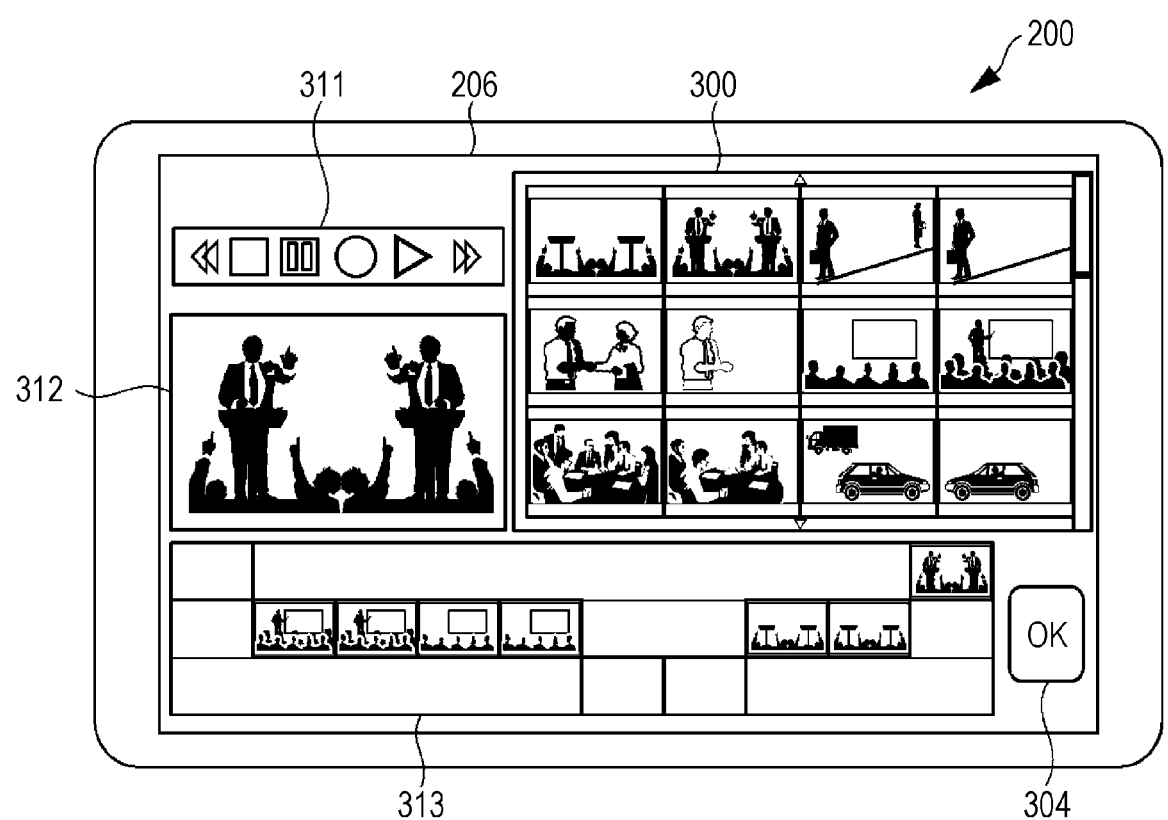
FIG. 20 is a diagram showing a configuration of a user interface for moving image editing according to a modification example.

As shown in FIG. 20, in addition to the user interface described in the embodiment, a control bar 311 for performing the reproduction, stop, pause, and the like of a moving image, an area 312 for displaying an edited moving image, an area 313 for performing the editing and processing of a moving image, and the like may be simultaneously displayed on the display unit 206 of the terminal device 200.

The display of meta information may be added to the display of a proxy moving image obtained by a plurality of imaging devices by combining the second embodiment and the third embodiment with each other.

Although the embodiments have been described on the assumption that the input unit 207 of the terminal device 200 is a touch panel configured integrally with the display unit 206, the input unit 207 may be a mouse or the like other than the touch panel. For example, in a case where the input unit 207 is a mouse, the user can scroll a screen in a direction in which an indicator is present to display a frame image by operating a pointer using the mouse and performing a click operation on the indicator. In addition, when the user operates the pointer using the mouse and moves a slider, a frame display area is scrolled in the same direction as a direction in which the slider is moved.

Additionally, the present technology may also be configured as below.

(1)

An information processing device that operates in a device including a display unit and causes the display unit to display a plurality of specific frame images constituting a moving image having a smaller data size than that of a moving image captured by another device different from the device including the display unit.

(2)

The information processing device according to (1), in which the specific frame images are frame images extracted at a fixed interval from the plurality of consecutive frame images.

(3)

The information processing device according to (2), in which, when a predetermined input for instructing a change in a time interval as the fixed interval is performed by a user on one frame image among a plurality of the specific frame images displayed on the display unit, the frame images are displayed with the fixed interval changed.

(4)

The information processing device according to (3), in which the display unit is a touch panel configured integrally with an input unit, and
the predetermined input is a pinch-in operation or a pinch-out operation performed on the touch panel with the one frame image as substantially the center.

(5)

The information processing device according to (4), in which, in a case where the predetermined input is a pinch-in operation, the time interval is reduced.

(6)

The information processing device according to (4), in which, in a case where the predetermined input is a pinch-out operation, the time interval is increased.

(7)

The information processing device according to (5), in which, in a case where the frame image is displayed with the time interval reduced in accordance with the user's pinch-in operation performed on the one frame image, the one frame image is displayed in a state where a display position is fixed.

(8)

The information processing device according to (6), in which, in a case where the frame images are displayed with the time interval increased in accordance with the user's pinch-out operation performed on the one frame image, the one frame image is displayed in a state where a display position is fixed.

(9)

The information processing device according to any one of (1) to (8), in which the frame images and meta information corresponding to the frame images are displayed on the display unit.

(10)

The information processing device according to (9), in which the specific frame images are frame images extracted from the plurality of consecutive frame images on the basis of the meta information.

(11)

The information processing device according to (9) or (10), in which the meta information is acquired by another device different from the device including the display unit.

(12)

The information processing device according to any one of (1) to (11), in which the moving image is a moving image captured by one or a plurality of other devices different from the device including the display unit.

(13)

The information processing device according to any one of (1) to (12), in which editing point information for editing the moving image is input by the user and is transmitted to the other device.

(14)

The information processing device according to (13), in which the editing point information is information indicating frame images serving as an in-point indicating a starting point and an out-point indicating a termination point of a scene in the moving image.

(15)

The information processing device according to (14), in which the frame image serving as the in-point and the frame image serving as the out-point displayed on the display unit are highlighted.

(16)

The information processing device according to (15), in which the editing point information includes a frame image reproduced a predetermined period of time before the frame image serving as the in-point and a frame image reproduced a predetermined period of time after the frame image serving as the out-point.

(17)

The information processing device according to (16), in which highlighting of the frame image serving as the in-point and the frame image serving as the out-point is maintained.

(18)

The information processing device according to any one of (1) to (17), in which the moving image is a moving image obtained by imaging a surgical operation, and the frame images constituting the moving image and information related to the surgical operation are displayed on the display unit.

(19)

An information processing method including:

displaying a plurality of specific frame images constituting a moving image on a display unit in a device including the display unit, the moving image having a smaller data size than that of a moving image captured by another device different from the device including the display unit.

(20)

An information processing program causing a computer to execute an information processing method of displaying a plurality of specific frame images constituting a moving image on a display unit in a device including the display unit, the moving image having a smaller data size than that of a moving image captured by another device different from the device including the display unit.

REFERENCE SIGNS LIST

100 Imaging device
200 Terminal device
206 Display unit
208 Information processing unit

The invention claimed is:

1. An information processing device comprising:
a memory; and
an electronic processor,
wherein the memory includes instructions that, when executed by the electronic processor, cause the electronic processor to perform a set of operations including
receiving a plurality of consecutive frame images constituting a proxy file of a first moving image captured by one or more devices, the proxy file including less than all frame images of the first moving image,
storing the proxy file in the memory,
generating a proxy image that serves as a proxy for the first moving image by extracting a plurality of specific frame images at a fixed interval from the proxy file that is stored in the memory, and
controlling a display unit of a second device to display the proxy image that has a smaller data size than the first moving image,
wherein the second device is separate and distinct from the one or more devices.

2. The information processing device according to claim 1,
wherein, when a predetermined input for instructing a change in a time interval as the fixed interval is performed by a user on one frame image among the plurality of specific frame images displayed on the display unit, the plurality of specific frame images are displayed with the fixed interval changed based on the predetermined input.

3. The information processing device according to claim 2, wherein
the display unit is a touch panel configured integrally with an input unit, and
the predetermined input is a pinch-in operation or a pinch-out operation performed on the touch panel with the one frame image substantially centered on the touch panel.

4. The information processing device according to claim 3,
wherein, in a first case where the predetermined input is the pinch-in operation, the time interval is reduced.

5. The information processing device according to claim 4,
wherein, in a second case where the one frame image is displayed with the time interval reduced in accordance with the pinch-in operation performed on the one frame image, the one frame image is displayed in a state where a display position is fixed.

6. The information processing device according to claim 3,
wherein, in a second case where the predetermined input is the pinch-out operation, the time interval is increased.

7. The information processing device according to claim 6,
wherein, in a third case where the plurality of specific frame images are displayed with the time interval increased in accordance with the pinch-out operation performed on the one frame image, the one frame image is displayed in a state where a display position is fixed.

8. The information processing device according to claim 2,
wherein editing point information for editing the first moving image is input by the user, and
wherein the set of operations further includes
generating a moving image editing operation that edits the first moving image based on the editing point information, and
transmitting the moving image editing operation to the one or more devices to control the one or more devices to perform a moving image editing process.

9. The information processing device according to claim 8,
wherein the editing point information is information indicating an in-point frame image serving as an in-point that indicates a starting point and an out-point frame image serving as an out-point that indicates a termination point of a scene in the first moving image.

10. The information processing device according to claim 9,
wherein the in-point frame image serving as the in-point and the out-point frame image serving as the out-point displayed on the display unit are highlighted.

11. The information processing device according to claim 10,
wherein the editing point information includes a first frame image reproduced a first predetermined period of time before the in-point frame image and a second frame image reproduced a second predetermined period of time after the out-point frame image.

12. The information processing device according to claim 11,
wherein highlighting of the in-point frame image and the out-point frame image is maintained.

13. The information processing device according to claim 1,
wherein the plurality of specific frame images and meta information corresponding to the plurality of specific frame images are displayed on the display unit.

14. The information processing device according to claim 13,
wherein extracting the plurality of specific frame images at the fixed interval from the proxy file further includes extracting the plurality of specific frame images from the proxy file on a basis of the meta information.

15. The information processing device according to claim 13,
wherein the meta information is acquired by a third device different from the second device.

16. The information processing device according to claim 1,
wherein the one or more devices is a two or more devices that are distinct from the second device, and wherein the first moving image is a collective moving image including respective moving images from the two or more devices.

17. The information processing device according to claim 1,
wherein the first moving image is a moving image obtained by imaging a surgical operation, and the plurality of specific frame images constituting the first moving image and information related to the surgical operation are displayed on the display unit.

18. The information processing device according to claim 1,
wherein the proxy image serves as the proxy for the first moving image because the memory does not store the first moving image.

19. An information processing method comprising:
receiving, with an electronic processor, a plurality of consecutive frame images constituting a proxy file of a first moving image captured by one or more devices, the proxy file including less than all frame images of the first moving image;
storing, with the electronic processor, the proxy file in a memory;
generating, with the electronic processor, a proxy image that serves as a proxy for the first moving image by extracting a plurality of specific frame images at a fixed interval from the proxy file that is stored in the memory; and
controlling, with the electronic processor, a display unit of a second device to display the proxy image that has a smaller data size than the first moving image,
wherein the second device is separate and distinct from the one or more devices that captured the first moving image.

20. The information processing method according to claim 19,
wherein the one or more devices is two or more devices that are distinct from the second device, and wherein the first moving image is a collective moving image including respective moving images from the two or more devices.

21. A non-transitory computer-readable medium comprising instructions that, when executed by an electronic processor, cause the electronic processor to perform a set of operations comprising:
receiving a plurality of consecutive frame images constituting a proxy file of a first moving image captured by one or more devices, the proxy file including less than all frame images of the first moving image;
controlling a memory to store the proxy file;
generating a proxy image that serves as a proxy for the first moving image by extracting a plurality of specific frame images at a fixed interval from the proxy file that is stored in the memory; and
controlling a display unit of a second device to display the proxy image that has a smaller data size than the first moving image,
wherein the second device is separate and distinct from the one or more devices that captured the first moving image.

* * * * *